(12) United States Patent
Abu-Orf

(10) Patent No.: US 7,473,364 B2
(45) Date of Patent: Jan. 6, 2009

(54) MULTIVALENT METAL ION MANAGEMENT FOR LOW SLUDGE PROCESSES

(75) Inventor: Mohammad M. Abu-Orf, Pittman, NJ (US)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

(21) Appl. No.: 11/683,162

(22) Filed: Mar. 7, 2007

(65) Prior Publication Data

US 2007/0209998 A1 Sep. 13, 2007

Related U.S. Application Data

(60) Provisional application No. 60/780,169, filed on Mar. 7, 2006.

(51) Int. Cl.
*C02F 3/31* (2006.01)
(52) U.S. Cl. .............. 210/607; 210/610; 210/620; 210/623; 210/625; 210/626; 210/631
(58) Field of Classification Search ........... 210/607, 210/610, 620, 623, 625, 626, 631
See application file for complete search history.

(56) References Cited

U.S. PATENT DOCUMENTS

| | | |
|---|---|---|
| 2,893,957 A | 7/1959 | Genter et al. |
| 3,047,492 A | 7/1962 | Gambrel |
| 3,192,155 A | 6/1965 | Bready et al. |
| 3,259,566 A | 7/1966 | Torpey |
| 3,544,476 A | 12/1970 | Aiba et al. |
| 3,617,540 A | 11/1971 | Bishop et al. |
| 3,756,946 A | 9/1973 | Levin et al. |
| 3,787,316 A | 1/1974 | Brink et al. |
| 3,907,672 A | 9/1975 | Milne |
| 3,964,998 A | 6/1976 | Barnard |
| 4,042,493 A | 8/1977 | Matsch et al. |
| 4,056,465 A | 11/1977 | Spector |

(Continued)

FOREIGN PATENT DOCUMENTS

DE 4 238 708 5/1994

(Continued)

OTHER PUBLICATIONS

Adams, M. W. W., and Robert M. Kelly, "Enzymes from Microorganisms in Extreme Environments," *Chemical & Engineering News*, Dec. 18, 1995, pp. 32-42, vol. 73, No. 51, American Chemical Society, Washington, D.C..

(Continued)

*Primary Examiner*—Chester T Barry

(57) ABSTRACT

A method for managing multivalent metal ion concentrations in low-yield wastewater treatment processes. The method includes combining wastewater containing BOD with bacteria-laden sludge in a mainstream reactor to form a mixed liquor, separating the mixed liquor into a clear effluent and an activated sludge stream, returning a first portion of the activated sludge stream to the mainstream reactor, processing a second portion of the activated sludge stream in a sidestream bioreactor, returning at least a portion of the activated sludge stream in the sidestream bioreactor to the mainstream reactor, and adding multivalent metal ions to at least one of the wastewater, the mixed liquor, the activated sludge stream and combinations thereof to reduce the generation of waste activated sludge.

55 Claims, 22 Drawing Sheets

U.S. PATENT DOCUMENTS

| | | |
|---|---|---|
| 4,132,638 A | 1/1979 | Carlsson |
| 4,141,822 A | 2/1979 | Levin et al. |
| 4,160,724 A | 7/1979 | Laughton |
| 4,162,153 A | 7/1979 | Spector |
| 4,180,459 A * | 12/1979 | Zievers ........................ 71/12 |
| 4,271,026 A | 6/1981 | Chen et al. |
| 4,277,342 A | 7/1981 | Hayes et al. |
| 4,279,753 A | 7/1981 | Nielson et al. |
| 4,284,510 A | 8/1981 | Savard et al. |
| 4,323,367 A | 4/1982 | Ghosh |
| 4,351,729 A | 9/1982 | Witt |
| 4,370,233 A | 1/1983 | Hayes et al. |
| 4,374,730 A | 2/1983 | Braha et al. |
| 4,407,717 A | 10/1983 | Teletzke et al. |
| 4,491,522 A | 1/1985 | Ishida et al. |
| 4,522,722 A | 6/1985 | Nicholas |
| 4,527,947 A | 7/1985 | Elliott |
| 4,537,682 A | 8/1985 | Wong-Chong |
| 4,568,457 A | 2/1986 | Sullivan |
| 4,568,462 A | 2/1986 | Böhnke et al. |
| 4,599,167 A | 7/1986 | Benjes et al. |
| 4,632,758 A | 12/1986 | Whittle |
| 4,643,830 A | 2/1987 | Reid |
| RE32,429 E | 6/1987 | Spector |
| 4,675,114 A | 6/1987 | Zagyvai et al. |
| 4,705,633 A | 11/1987 | Bogusch |
| 4,731,185 A | 3/1988 | Chen et al. |
| 4,780,198 A | 10/1988 | Crawford et al. |
| 4,790,939 A | 12/1988 | Suzuki et al. |
| 4,797,212 A | 1/1989 | Von Nordenskjöld |
| 4,818,391 A | 4/1989 | Love |
| 4,842,732 A | 6/1989 | Tharp |
| 4,849,108 A | 7/1989 | De Wilde et al. |
| 4,867,883 A | 9/1989 | Daigger et al. |
| 4,874,519 A | 10/1989 | Williamson |
| 4,891,136 A | 1/1990 | Voyt |
| 4,915,840 A | 4/1990 | Rozich |
| 4,956,094 A | 9/1990 | Levin et al. |
| 4,961,854 A | 10/1990 | Wittmann et al. |
| 4,975,197 A | 12/1990 | Wittmann et al. |
| 4,999,111 A | 3/1991 | Williamson |
| 5,013,442 A | 5/1991 | Davis et al. |
| 5,019,266 A | 5/1991 | Soeder et al. |
| 5,022,993 A | 6/1991 | Williamson |
| 5,051,191 A | 9/1991 | Rasmussen et al. |
| 5,094,752 A | 3/1992 | Davis et al. |
| 5,098,567 A | 3/1992 | Nishiguchi |
| 5,114,587 A | 5/1992 | Hagerstedt |
| 5,126,049 A | 6/1992 | Hallberg |
| 5,128,040 A | 7/1992 | Molof et al. |
| 5,137,636 A | 8/1992 | Bundgaard |
| 5,151,187 A | 9/1992 | Behmann |
| 5,182,021 A | 1/1993 | Spector |
| 5,234,595 A | 8/1993 | DiGregorio et al. |
| 5,246,585 A | 9/1993 | Meiring |
| 5,254,253 A | 10/1993 | Behmann |
| 5,288,405 A | 2/1994 | Lamb, III |
| 5,288,406 A | 2/1994 | Stein |
| 5,304,308 A | 4/1994 | Tsumura et al. |
| 5,316,682 A | 5/1994 | Keyser et al. |
| 5,336,290 A | 8/1994 | Jermstad |
| 5,342,522 A | 8/1994 | Marsman et al. |
| 5,348,653 A | 9/1994 | Rovel |
| 5,348,655 A | 9/1994 | Simas et al. |
| 5,356,537 A | 10/1994 | Thurmond et al. |
| 5,376,242 A | 12/1994 | Hayakawa |
| 5,380,438 A | 1/1995 | Nungesser |
| 5,389,258 A | 2/1995 | Smis et al. |
| 5,480,548 A | 1/1996 | Daigger et al. |
| 5,482,630 A | 1/1996 | Lee et al. |
| 5,505,862 A | 4/1996 | Sonnenrein |
| 5,514,277 A | 5/1996 | Khudenko |
| 5,514,278 A | 5/1996 | Khudenko |
| 5,531,896 A | 7/1996 | Tambo et al. |
| 5,543,051 A | 8/1996 | Harris |
| 5,543,063 A | 8/1996 | Walker et al. |
| 5,582,734 A | 12/1996 | Coleman et al. |
| 5,601,719 A | 2/1997 | Hawkins et al. |
| 5,611,927 A | 3/1997 | Schmid |
| 5,624,562 A | 4/1997 | Scroggins |
| 5,624,565 A | 4/1997 | Lefevre et al. |
| 5,626,755 A | 5/1997 | Keyser et al. |
| 5,650,069 A | 7/1997 | Hong et al. |
| 5,651,891 A | 7/1997 | Molof et al. |
| 5,658,458 A | 8/1997 | Keyser et al. |
| 5,725,772 A | 3/1998 | Shirodkar |
| 5,733,455 A | 3/1998 | Molof et al. |
| 5,733,456 A | 3/1998 | Okey et al. |
| 5,746,919 A | 5/1998 | Dague et al. |
| 5,773,526 A | 6/1998 | Van Dijk et al. |
| 5,811,008 A | 9/1998 | Von Nordenskjold |
| 5,818,412 A | 10/1998 | Maekawa |
| 5,824,222 A | 10/1998 | Keyser et al. |
| 5,833,856 A | 11/1998 | Liu et al. |
| 5,846,424 A | 12/1998 | Khudenko |
| 5,853,588 A | 12/1998 | Molof et al. |
| 5,858,222 A | 1/1999 | Shibata et al. |
| 5,919,367 A | 7/1999 | Khudenko |
| 5,989,428 A | 11/1999 | Goronszy |
| 5,993,503 A | 11/1999 | Kruidhof |
| 6,004,463 A | 12/1999 | Swett |
| 6,015,496 A | 1/2000 | Khudenko |
| 6,036,862 A | 3/2000 | Stover |
| 6,039,874 A | 3/2000 | Teran et al. |
| 6,047,768 A | 4/2000 | Buehler, III |
| 6,054,044 A | 4/2000 | Hoffland et al. |
| 6,066,256 A | 5/2000 | Henry et al. |
| 6,077,430 A | 6/2000 | Chudoba et al. |
| 6,113,788 A | 9/2000 | Molof et al. |
| 6,117,323 A | 9/2000 | Haggerty |
| 6,193,889 B1 | 2/2001 | Teran et al. |
| 6,217,768 B1 | 4/2001 | Hansen et al. |
| 6,352,643 B1 | 3/2002 | Kwon et al. |
| 6,383,387 B2 | 5/2002 | Hasegawa et al. |
| 6,416,668 B1 | 7/2002 | Al-Samadi |
| 6,454,949 B1 | 9/2002 | Sesay et al. |
| 6,527,956 B1 | 3/2003 | Lefevre et al. |
| 6,555,002 B2 | 4/2003 | Garcia et al. |
| 6,562,237 B1 | 5/2003 | Olaopa |
| 6,585,895 B2 | 7/2003 | Smith et al. |
| 6,592,762 B2 | 7/2003 | Smith |
| 6,605,220 B2 | 8/2003 | Garcia et al. |
| 6,613,238 B2 | 9/2003 | Schloss |
| 6,630,067 B2 | 10/2003 | Shieh et al. |
| 6,660,163 B2 | 12/2003 | Miklos |
| 6,706,185 B2 | 3/2004 | Goel et al. |
| 6,712,970 B1 | 3/2004 | Trivedi |
| 6,783,679 B1 | 8/2004 | Rozich |
| 6,787,035 B2 | 9/2004 | Wang |
| 6,805,806 B2 | 10/2004 | Arnaud |
| 6,814,868 B2 | 11/2004 | Phagoo et al. |
| 6,833,074 B2 | 12/2004 | Miklos |
| 6,863,818 B2 | 3/2005 | Daigger et al. |
| 6,884,355 B2 | 4/2005 | Kamiya et al. |
| 6,893,567 B1 | 5/2005 | Vanotti et al. |
| 7,105,091 B2 | 9/2006 | Miklos |
| 7,208,090 B2 | 4/2007 | Applegate et al. |
| 7,258,791 B2 * | 8/2007 | Matsumoto ................ 210/607 |
| 2001/0045390 A1 | 11/2001 | Kim et al. |
| 2004/0016698 A1 | 1/2004 | Unger |
| 2005/0040103 A1 | 2/2005 | Abu-Orf et al. |
| 2005/0045557 A1 | 3/2005 | Daigger et al. |
| 2006/0113243 A1 | 6/2006 | Applegate et al. |
| 2007/0000836 A1 | 1/2007 | Elefritz et al. |

2007/0051677 A1 3/2007 Curtis et al.

FOREIGN PATENT DOCUMENTS

| DE | 4444335 | 6/1996 |
|---|---|---|
| EP | 0 106 043 | 4/1984 |
| EP | 0 408 878 | 1/1991 |
| EP | 0 440 996 | 8/1991 |
| EP | 1 236 686 | 9/2002 |
| GB | 2 006 743 | 5/1979 |
| JP | 59032999 | 2/1984 |
| JP | 59052597 | 3/1984 |
| JP | 60-84199 | 5/1985 |
| JP | 61192389 | 8/1986 |
| JP | 63130197 | 6/1988 |
| JP | 62138986 | 12/1988 |
| JP | 63302996 | 12/1988 |
| JP | 3042019 | 2/1991 |
| JP | 6091285 | 4/1994 |
| JP | P2000-199086 | 7/2000 |
| JP | 2000210542 | 8/2000 |
| NL | 9301791 | 10/1993 |
| RU | 1 596 752 | 9/1995 |
| WO | WO 93/15026 | 8/1993 |
| WO | WO 94/24055 | 10/1994 |
| WO | WO 03/072512 | 9/2003 |

OTHER PUBLICATIONS

Casey, T. G., et al., "A Hypothesis for the Causes and Control of Anoxic-Aerobic (AA) Filament Bulking in Nutrient Removal Activated Sludge Systems," Water Science and Technology, 1994, pp. 203-212, vol. 29, No. 7, IAWQ/Pergamon.
Cecchi, F., et al., "Anaerobic Digestion of Municipal Solid Waste," BioCycle, Jun. 1990, pp. 42-43, vol. 31, No. 6, The JG Press, Inc.
Chen, G-H., et al., "Minimization of Activated Sludge Production by Chemically Stimulated Energy Spilling," Water Science and Technology, 2000, pp. 189-200, vol. 42, No. 12, IWA Publishing.
Chen, Guang-Hao, et al., "Effect of Sludge Fasting/Feasting on Growth of Activated Sludge Cultures," Wat. Res., 2001, pp. 1029-1037, vol. 35, No. 4, Elsevier Science Ltd./Pergamon.
Chudoba, P., et al., "The Aspect of Energetic Uncoupling of Microbial Growth in the Activated Sludge Process—OSA System," Water Science and Technology, 1992, pp. 2477-2480, vol. 26, No. 9-11, IAWPRC.
Ekama, G. A., et al., "Considerations in the Process Design of Nutrient Removal Activated Sludge Processes," Water Science and Technology, 1983, pp. 283-318, vol. 15, IAWPRC/Pergamon Press Ltd..
Fukase, T., et al., "Factors Affecting Biological Removal of Phosphorus,"Water Science and Technology, 1985, pp. 187-198, vol. 17, Nos. 11/12, IAWPRC, London.
Harrison, D. E. F., and J. E. Loveless, "Transient Responses of Facultatively Anaerobic Bacteria Growing in Chemostat Culture to a Change from Anaerobic to Aerobic Conditions," Journal of General Microbiology, 1971, pp. 45-52, vol. 68.
Heinzmann, Bernd, and Gerd Engel, "Phosphorus Recycling in Treatment Plants with Biological Phosphorus Removal," paper presented at the German Federal Environment Ministry, Feb. 6-7, 2003, pp. 1-16, Berlin, Germany.
Hong, S., et al., "Biological Phosphorus and Nitrogen Removal Via the A/O Process: Recent Experience in the United States and United Kingdom," Water Science and Technology, 1984, pp. 151-172, vol. 16, Vienna, Austria.
Low, Euan W., and Howard A. Chase, "The Use of Chemical Uncouplers for Reducing Biomass Production During Biodegradation," Water Science and Technology, 1998, pp. 399-402, vol. 37, No. 4-5, Elsevier Science Ltd./Pergamon.
Marais, G. v. R., et al., "Observations Supporting Phosphate Removal by Biological Excess Uptake—A Review," Water Science and Technology, 1983, pp. 15-41, vol. 15, IAWPRC/Pergamon Press. Ltd.
Matsuo, Tomonori, et al., "Metabolism of Organic Substances in Anaerobic Phase of Biological Phosphate Uptake Process," Water Science and Technology, 1992, pp. 83-92, vol. 25, No. 6, IAWPRC/Pergamon Press Ltd, Oxford.

Metcalf & Eddy, Table 8-25, "Description of suspended growth processes for phosphorus removal," Wastewater Engineering Treatment and Reuse, 4th ed., 2003, pp. 810-813, McGraw Hill.
Nielsen, Per Halkjær, "The Significance of Microbial FE (III) Reduction in the Activated Sludge Process," Water Science and Technology, 1996, pp. 129-136, vol. 34, Nos. 5-6, Elsevier Science Ltd./Pergamon.
Rader, "Microrganisms and Their Role in the Activated-Sludge Process," Web page accessed Jan. 11, 2005, http://www.college.ucla.edu/webproject/micro7/studentprojects7/Rader/asludge2.htm , pp. 1-19.
Strand, Stuart E., et al., "Activated-Sludge Yield Reduction Using Chemical Uncouplers," Water Environment Research, 1999, pp. 454-458, vol. 71, No. 4.
Valentis, G., and J. Lesavre, "Wastewater Treatment by Attached-Growth Micro-Organisms on a Geotextile Support," Water Science and Technology, 1990, pp. 43-51, vol. 22, Nos. 1/2, IAWPRC.
Van Loosdrecht, Mark C. M., and Mogens Henze, "Maintenance, Endogeneous Respiration, Lysis, Decay and Predation," Water Science and Technology, 1999, pp. 107-117, vol. 39, No. 1, IAWQ/Elsevier Science Ltd./Pergamon.
Wentzel, M. C., et al., "Processes and Modelling of Nitrification Denitrification Biological Excess Phosphorus Removal Systems—A Review," Water Science and Technology, 1992, pp. 59-82, vol. 25, No. 6, IAWPRC/Pergamon Press Ltd., Oxford.
Westgarth, W. C., et al., "Anaerobiosis in the Activated-Sludge Process," (paper presentation and formal discussions) Department of Environmental Sciences and Engineering, School of Public Health, University of North Carolina, Chapel Hill, pp. 43-61 (neither publication information nor year provided).
Worthen, Peter T., "The Chesapeake Bay Plan: Restoring An Estuary In Distress," Water Engineering & Management, Sep. 1994, pp. 18-22, vol. 141, No. 9, ABI/INFORM Global.
Yasui, H., and M. Shibata, "An Innovative Approach to Reduce Excess Sludge Production in the Activated Sludge Process," Water Science and Technology, 1995, pp. 11-20, vol. 30, No. 9, IAWQ/Pergamon.
Yasui, H., et al., "A Full-Scale Operation of a Novel Activated Sludge Process Without Excess Sludge Production," Water Science and Technology, 1996, pp. 395-404, vol. 34, No. 3-4, Elsevier Science Ltd./Pergamon.
"Contrashear filter solutions for waste water," for Contra Shear™, Jul. 29, 2005, p. 1 of 1, http://www.contrashear.co.nz/.
"Efficient treatment of high strength industrial and municipal wastewater" brochure by Envirex Inc., Jan. 1990.
"GAC Fluid Bed Efficient, economical bioremediation of BTEX groundwater" brochure by Envirex Inc., Dec. 1992.
"Internally-fed Rotary Wedgewire Screens" brochure by Parkson Corporation for Hycor® Rotoshear® (year not provided).
"Rex VLR/SCC System" brochure by Envirex Inc., Bulletin No. 315-156, Oct. 1989.
"The Rotoscreen™ Escalating Fine Channel Screen Builds Pre-Coat to Provide High Solids Capture Rates with the Lowest Headloss," Jul. 29, 2005, p. 1 of 2-page screen, Parkson Corporation Web Home Page, http://www.parkson.com/Content.aspx?ntopicid=120 &parent=process&processID=148.
"The Rotoshear® Internally Fed Rotating Drum Screen's Wedgewire Construction Maximizes Capture for Efficient Screening with Minimal Operator Attention," Jul. 29, 2005, p. 1 of 2-page screen, Parkson Corporation Web Home Page, http://www.parkson.com/Content.aspx?ntopicid=133&parent=municipal&processID=149 . . . .
"Vertical loop reactors—fine bubble power efficiency without fine bubble maintenance" brochure by Envirex Inc., Jan. 1986.
Charpentier, et al., "ORP Regulation and Activated Sludge 15 years of Experience," 19th Biennial Conference/AWQ of Vancouver—Jun. 1998.
Klopping, et al., "Activated Sludge Microbiology, Filamentous and Non-Filamentous Microbiological Problems and Biological Nutrient Removal," Water Environment Federation, Plant Operations Specialty Conference, Date Unknown.
Caulet, et al., "Modulated Aeration Management by Combined ORP and DO Control: A Guarantee of Quality and Power Savings for Carbon and Nitrogen Removal in Full Scale Wastewater Treatment Plants," Center of International Research for Water Environment, France, 1999.

Chudoba, et al., "Pre-Denitrification Performance of a High-Loaded Anoxic Sludge," Degremont Research Center, France, 1999.

Ra, et al., "Biological Nutrient Removal with an Internal Organic Carbon Source in Piggery Wastwater Treatment," *Water Research*, vol. 34 No. 3, pp. 965-973, 2000.

Kim, et al., "pH and Oxidation-Reduction Potential Control Strategy for Optimization of Nitrogen Removal in an Alternating Aerobic-Anoxic System," *Water Environment Research*, vol. 73, No. 1, 2001.

Abu-Orf, M. M., et al., "Chemical and Physical Pretreatment of ATAD Biosolids for Dewatering," *Water Science Technology*, 2001, vol. 44, No. 10, pp. 309-314, IWA Publishing.

Bakker, E. P., Chapter IIA, "Cell $K^+$ and $K^+$ Transport Systems in Prokaryotes," *In Alkali Cation Transport Systems in Prokaryotes*, Bakker, E.P., Ed., 1993, pp. 205-224, CRC Press.

Bishop, P. L., et al., "Fate of Nutrients during Aerobic Digestion," *Journal Environ. Eng. Div., Proc. Am. Soc. Civil Eng.*, 1978, vol. 104 No. EE5, pp. 967-979.

Bruus, J. H., et al., "On the Stability of Activated Sludge Flocs with Implications to Dewatering," *Water Research*, 1992, vol. 26, No. 12 pp. 1597-1604, Pergamon Press Ltd.

Dignac, M.-F., et al., "Chemical Description of Extracellular Polymers: Implication on Activated Sludge Floc Structure," *Water Science Technology*, 1998, vol. 38, No. 8-9, pp. 45-53, Elsevier Science Ltd.

Dubois, M., et al., "Colorimetric Method for Determination of Sugars and Related Substances," *Analytical Chemistry*, 1956, vol. 28, No. 3, pp. 350-356.

Frølund, B., et al., "Extraction of Extracellular Polymers from Activated Sludge Using a Cation Exchange Resin," *Water Research*, 1996, vol. 30, No. 8, pp. 1749-1758, Elsevier Science Ltd.

Hartree, E. F., "Determination of Protein: A Modification of the Lowry Method that Gives a Linear Photometric Response," *Analytical Biochemistry*, 1972, vol. 48, pp. 422-427, Academic Press, Inc.

Higgins, M. J., et al., "Characterization of Exocellular Protein and Its Role in Bioflocculation," *Journal of Environmental Engineering*, 1997, vol. 123, pp. 479-485.

Higgins, M. J., et al., "The Effect of Cations on the Settling and Dewatering of Activated Sludges: Laboratory Results," *Water Environment Research*, 1997, vol. 69, No. 2, pp. 215-224.

Kakii, K., et al., "Effect of Calcium Ion on Sludge Characteristics," *J. Ferment. Technol.*, 1985, vol. 63, No. 3, pp. 263-270.

Lowry, O. H., et al., "Protein Measurement with the Folin Phenol Reagent," *J. Bio. Chem.*, 1951, vol. 193, pp. 265-275.

Mahmoud, N., et al., "Anaerobic Stabilisation and Conversion of Biopolymers in Primary Sludge—Effect of Temperature and Sludge Retention Time," *Water Research*, 2004, vol. 38, pp. 983-991, Elsevier Ltd.

Mavinic, D. S., et al., "Fate of Nitrogen in Aerobic Sludge Digestion," *J. Water Pollut. Control Fed.*, 1982, vol. 54, No. 4, pp. 352-360.

Moen, G., et al., "Effect of Solids Retention Time on the Performance of Thermophilic and Mesophilic Digestion of Combined Municipal Wastewater Sludges," *Water Environment Research*, 2003, vol. 75, No. 6, pp. 539-548.

Murthy, S. N., et al., "Factors Affecting Floc Properties During Aerobic Digestion: Implications for Dewatering," *Water Environment Research*, 1999, vol. 71, No. 2, pp. 197-202.

Murthy, S. N., et al., "Optimizing Dewatering of Biosolids from Autothermal Thermophilic Aerobic Digesters (ATAD) Using Inorganic Conditioners," *Water Environment Research*, 2000, vol. 72, No. 6, pp. 714-721.

Nielsen, P. H., et al., "Changes in the Composition of Extracellular Polymeric Substances in Activated Sludge During Anaerobic Storage," *Appl. Microbiol. Biotechnol.*, 1996, vol. 44, pp. 823-830, Springer-Verlag.

Novak, J. T., et al., "Mechanisms of Floc Destruction During Anaerobic and Aerobic Digestion and the Effect on Conditioning and Dewatering of Biosolids," *Water Research*, 2003, vol. 37, pp. 3136-3144, Elsevier Science Ltd.

Park, C., et al., "The Digestibility of Waste Activated Sludges," *Water Environment Research*, 2006, vol. 78, No. 1, pp. 59-68.

Rasmussen, H., et al., "Iron Reduction in Activated Sludge Measured with Different Extraction Techniques," *Water Research*, 1996, vol. 30, No. 3, pp. 551-558, Elsevier Science Ltd.

Urbain, V., et al., "Bioflocculation in Activated Sludge: An Analytic Approach," *Water Research*, 1993, vol. 27, No. 5, pp. 829-838, Pergamon Press Ltd.

U.S. Environmental Protection Agency, "Acid Digestion of Sediments, Sludges, and Soils," U.S. EPA Method 3050B, 1996, pp. 1-12.

Holbrook, R. D., et al., "A Comparison of Membrane Bioreactor and Conventional-Activated-Sludge Mixed Liquor and Biosolids Characteristics," *Water Environment Research*, 2005, vol. 77, No. 4, pp. 323-330.

Park, C., et al., "The Effect of Wastewater Cations on Activated Sludge Characteristics: Effects of Aluminum and Iron in Floc," *Water Environment Research*, 2006, vol. 78, No. 1, pp. 31-40.

Abu-Orf, M., et al. "Adjusting Floc Cations to Improve Effluent Quality: The Case of Aluminum Addition at Sioux City Wastewater Treatment Facility," *Water Environment Federation*, 2004, 16 pgs.

\* cited by examiner

MULTIVALENT METAL ION MANAGEMENT FOR LOW SLUDGE PROCESSES

This application claims priority under 35 U.S.C. §119(e) to U.S. Provisional Patent Application No. 60/780,169 filed Mar. 7, 2006, the entire content of which is hereby incorporated by reference.

BACKGROUND

The present invention relates to an activated sludge wastewater treatment process. More particularly, the invention relates to multivalent metal ion management for low-yield wastewater treatment processes.

Organic water pollutants can often be removed by biological wastewater treatment, that is, by cultivating bacteria to convert most of the organic pollutants in the wastewater to carbon dioxide, water and bacterial cell mass ("biomass"). This biological process is similar to that used by the human body to convert food into heat, muscle mass and motion.

A conventional activated sludge wastewater treatment process is shown in FIG. 1. The process generally involves cultivating within an aeration reactor a "mixed liquor" of bacterial cells suspended in wastewater. The bacterial cells are only slightly denser than water, and so are easily maintained in suspension ("suspended growth"). Solid-liquid separators, such as large quiescent clarifiers or membrane-based systems, are typically used to separate the cultivated mixed liquor into a liquid suspension of biomass ("activated sludge") and a clear effluent. The clear effluent may be removed from the waste stream and discharged into a local waterway. At least a portion of the activated sludge may be recycled to the aeration reactor as return activated sludge (RAS). The RAS helps maintain a sufficient concentration of bacterial cells in the aeration reactor for effective cleaning of the incoming wastewater. Since conversion of the readily degradable solids creates additional biomass within the wastewater treatment system, a portion of the activated sludge is typically removed from the plant as waste activated sludge (WAS) to maintain the biomass within an acceptable performance range.

Current wastewater treatment processes exhibit two important drawbacks. First, many wastewater treatment processes generate large amounts of WAS that must be sent off-site for disposal. Handling and disposal of WAS is typically the largest single cost component in the operation of a wastewater treatment plant. Second, most wastewater treatment processes cannot effectively respond to diurnal, seasonal, or long-term variations in the composition of wastewater. A treatment process that may be effective in treating wastewater during one time of the year may not be as effective at treating wastewater during another time of the year. Therefore, a need exists within the industry for wastewater treatment processes that both lower WAS and adjust effectively to fluctuations in wastewater composition.

SUMMARY

In one embodiment, the invention provides a method for reducing waste activated sludge in a wastewater treatment system, the method comprising combining wastewater comprising BOD with bacteria-laden sludge in a mainstream reactor to form a mixed liquor, separating the mixed liquor into a clear effluent and an activated sludge stream, returning a first portion of the activated sludge stream to the mainstream reactor, processing a second portion of the activated sludge stream in a sidestream bioreactor, returning at least a portion of the activated sludge stream in the sidestream bioreactor to the mainstream reactor, and adding multivalent metal ions to at least one of the wastewater, the mixed liquor, the activated sludge stream and combinations thereof to reduce the generation of waste activated sludge.

In another embodiment, the invention provides a method for reducing waste activated sludge in a wastewater treatment system, the method comprising combining wastewater comprising BOD and phosphorus with bacteria-laden sludge in a mainstream reactor to form a mixed liquor, separating the mixed liquor into a clear effluent and an activated sludge stream, returning a first portion of the activated sludge stream to the mainstream reactor, processing a second portion of the activated sludge stream in a sidestream bioreactor, removing phosphorus from at least a portion of the activated sludge stream processed in the sidestream bioreactor, transferring at least a portion of the activated sludge stream from which phosphorus has been removed to the mainstream reactor, and adding multivalent metal ions to at least one of the wastewater, the mixed liquor, the activated sludge stream and combinations thereof to reduce the generation of waste activated sludge.

In yet another embodiment, the invention provides a method for reducing waste activated sludge in a wastewater treatment system, the method comprising combining wastewater comprising BOD and phosphorus with bacteria-laden sludge in a mainstream reactor to form a mixed liquor, separating the mixed liquor into a clear effluent and activated sludge stream, returning a first portion of the activated sludge stream to the mainstream reactor, processing a second portion of the activated sludge stream in a sidestream bioreactor, returning at least a portion of the activated sludge stream in the bioreactor to the mainstream reactor, and adding $Fe^{3+}$ ions to at least one of the wastewater, the mixed liquor, the activated sludge stream and combinations thereof to reduce the generation of waste activated sludge, wherein at least one of the mainstream reactor, the sidestream bioreactor and a combination thereof comprises an anaerobic environment.

Other aspects of the invention will become apparent by consideration of the detailed description and accompanying drawings.

DETAILED DESCRIPTION

Figure 1:
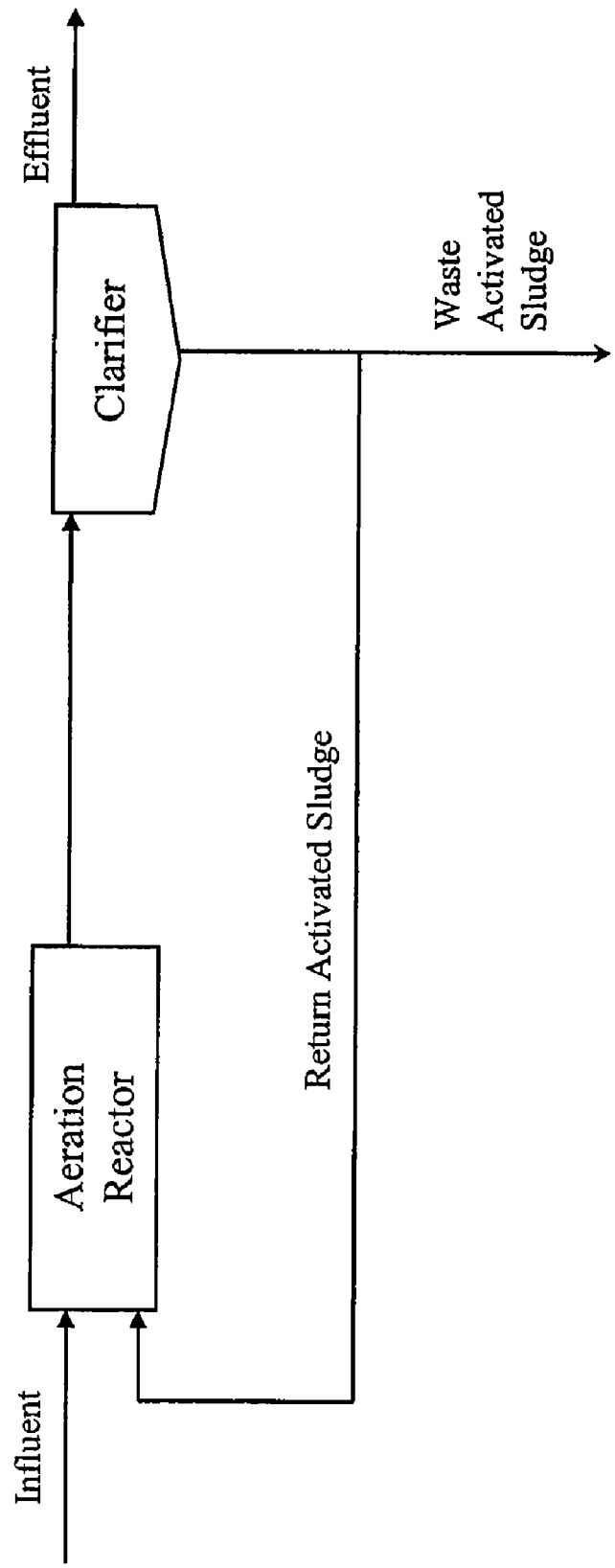
FIG. 1 is a schematic view of a traditional activated sludge wastewater treatment system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the term "conduit" is used broadly to represent a pathway, and is not meant to be restricted to any particular physical or mechanical device.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Wastewater containing organic pollutants may be subjected to anaerobic and aerobic digestion to achieve destruction of pathogens and reduction of volatile solids (and therefore, reduction of odor potential and vector attraction). However, in spite of the widespread usages of digestion in wastewater treatment, the performance of sludge digestion still remains unpredictable. As a result, many wastewater treatment systems still generate large quantities of WAS that must be properly disposed of off-site. The present invention relates to wastewater treatment processes that include a bioreactor for sludge reduction and further relates to multivalent metal ion management in such wastewater treatment processes that may be used with anaerobic digestion, aerobic digestion or combinations thereof to minimize WAS. In particularly, in such wastewater treatment processes it has been found that $Fe^{3+}$ in combination with anaerobic digestion and/or divalent metals in combination with aerobic digestion can facilitate the reduction of WAS generated by a wastewater treatment process.

Effect of Multivalent Metal Ions on Digestibility of Waste Activated Sludges Anaerobic and aerobic digestion undergo distinct microbiological and biochemical transformations and may produce products with different dewatering properties. Historically, a great deal of study has been conducted to describe digestion kinetics and to assess various treatment variables affecting digester performance. However, the fundamental question as to whether a specific sludge is better treated by anaerobic or aerobic digestion has not been evaluated. This is because it is often assumed that the material undergoing degradation by either anaerobic or aerobic digestion is the same organic material. There are no specific sludge-based criteria for selecting a digestion method. Rather, secondary factors such as the size of the wastewater treatment plant, complexity of the process, and economic interests are more commonly considered for selecting a digestion option.

There is a unique cation and biopolymer response to anaerobic and aerobic digestion. Activated sludges collected from two municipal wastewater treatment plants (WWTPs) underwent both anaerobic and aerobic digestion. Aerobic digestion resulted in the release of $Ca^{2+}$ and $Mg^{2+}$ into solution in conjunction with volatile solids (VS) destruction and accumulation of solution polysaccharide. In contrast, during anaerobic digestion, a large amount of protein was released during anaerobic digestion but divalent cations were not released. The large release of protein in anaerobic digestion may be due to the loss of selective binding between protein and Fe (III) under Fe-reducing conditions. Accordingly, the flocs may consist of two important biopolymer fractions, divalent cation-bound biopolymer and an Fe-associated biopolymer.

Extracellular polymeric substances (EPS) comprise the major organic fraction in activated sludge floc and various metal ions are intimately associated with this biopolymeric network. Therefore, changes in cations and EPS during digestion might be associated with the digestibility of sludge under anaerobic or aerobic conditions. Although there is still debate as to the nature of EPS in floc, activated sludge EPS is primarily composed of protein, polysaccharide, humic acid and nucleic acids. Moreover, protein is the major constituent of EPS in activated sludge floc. EPS can originate from microbial metabolism, cell lysis and wastewater influent. The biopolymer produced during flocculation is also another important source of activated sludge EPS. However, little is known about the distribution of these exocellular materials within floc and how this distribution may affect floc properties and the effectiveness of digestion.

Divalent cations improve floc stability by bridging the negatively charged biopolymers. However, the relative significance of $Ca^{2+}$ and $Mg^{2+}$ and affinity of each cation for specific EPS fractions are not fully understood. Polysaccharides in biopolymers are alginates and these biopolymers bind to $Ca^{2+}$ to form a gel-like floc structure. Additionally, proteins appear to be more strongly associated with $Ca^{2+}$ and $Mg^{2+}$ than polysaccharides. A floc model has been proposed in which lectin-like proteins are cross-linked to polysaccharides and both $Mg^{2+}$ and $Ca^{2+}$ provide bridging to this biopolymer network. Lectins are multivalent carbohydrate-binding proteins that are associated with agglutination or clumping of cells. The monovalent cations, especially $Na^+$, appear to displace $Ca^{2+}$ and $Mg^{2+}$ within this lectin structure and weaken floc strength, causing poor settling and dewatering of sludge and deterioration of effluent quality.

Floc Al and Fe have significant impacts on activated sludge characteristics. For example, activated sludges from various WWTPs contained highly varying amounts of Al and Fe, and the facilities that lacked floc Al and Fe lost a significant amount of biopolymer into the plant effluent. Because Al and Fe may influence bioflocculation, they may also impact the digestion of waste activated sludge. This is because the large amount of biopolymer that is washed out of the system due to low levels of floc Al and Fe might be the organic matter that could be degraded during a digestion of sludge.

The yield of a wastewater treatment system may also be influenced by Al and Fe. Yield refers to the net rate of production of excess biomass in an activated sludge wastewater treatment process. A low-yield process generates less WAS, thus reducing costs associated with waste disposal. For example, three bench scale reactors were fed artificial wastewater streams identical in every way except for the Fe to Al ratio (wt/wt). A ratio of 0:1 (Fe/Al) led to a high-yield waste. Ratios of 2:1 and 1:1 (Fe/Al) led to low-yield wastes. This suggests that material associated with Al ions may be more difficult to degrade than those materials associated with Fe ions.

The characteristics of feed sludge are not generally considered a factor when selecting between anaerobic and aerobic digestion. As a result, biosolids that do not meet treatment goals can be produced and this can impact ultimate disposal, especially if odors are produced. In the future, regulations and costs pertaining to solids handling could become more stringent, making efficient sludge stabilization of greater importance.

The examples below illustrate how the addition of multivalent metal ions can be used to facilitate digestion in low-yield wastewater treatment processes.

EXAMPLES

Experimental approach. Nine WAS samples collected from seven WWTPs were batch digested under both anaerobic and aerobic conditions for 30 days at 25° C. As shown in Table 1, the solids concentration of WAS used for the digestion studies varied from 5.22 g/L to 8.87 g/L (within±20% of mean concentration) except for WAS A (18.74 g/L).

In order to directly compare floc destruction mechanisms in anaerobic and aerobic digestion, both anaerobic and aerobic digestion were conducted at the same temperature (~25° C.). This temperature is lower than the usual anaerobic digestion temperature of 35° C. However, the extent of digestion under anaerobic conditions is not temperature dependent, although the rate is and at 25° C., anaerobic digestion is within 90% of that occurring at 35° C. In addition, the time needed to reach the maximum VS destruction is faster under batch conditions, since fresh feed is not being continuously provided as occurs in full-scale digesters.

For both anaerobic and aerobic units, three liters of WAS were placed in four-liter batch reactors and mixing was continuously provided by magnetic stirrers. In the aerobic digesters, air stones were placed at the bottom of the reactor and air was fed through a humidifier to minimize evaporation. When make-up water was needed, distilled water was added. For the anaerobic digestion systems, a rubber stopper, pierced with a glass tube to serve as a gas collector, was placed on the anaerobic digester and tightly sealed to avoid gas leakage. No anaerobic digestion data is available for WAS F2 because adhesive spilled into the reactor when replacing the stopper following sampling, so it was discarded.

Analyses of cations, anions, biopolymer and dewatering rates were conducted using undigested and digested WAS. A series of filtering processes using different size filters were performed using WAS and digested sludges in order to determine the molecular weight distributions of biopolymer in solution. For this analysis, all the sludge samples were centrifuged at 9,460 g for 15 minutes and aliquots of centrate were individually filtered through 1.5 µm, 0.45 µm, 30,000 Dalton (30 k) and 1,000 Dalton (1 k) filters. Samples were not sequentially filtered, but rather, each sample of centrate was filtered through only one filter. Ultrafiltration was performed at 60 psi through Amicon YM30 (30 k) and YMI (1 k) partly hydrophilic membranes (Amicon, Mass.). In this study, the term 'soluble' or 'solution' refers to be the material that can be filtered through a 0.45 µm filter.

Analysis. The soluble cations, $Na^+$, $K^+$, $NH_4^+$, $Mg^{2+}$, and $Ca^{2+}$ were analyzed using a Dionex Ion Chromatograph (IC). The soluble anions, $NO_2^-$ and $NO_3^-$ were also determined by IC. Total Fe and Al in dry sludge were measured using EPA method 3050B (acid digestion for metals analysis of soils, sediments, and sludges, 1996). WAS and digested sludges were dried at 105° C. and a portion used for acid digestion. Fe and Al in the acid digested samples were quantified using an Atomic Absorption Spectrometer (AA). Solution phase of Fe and Al was also determined using at AA. However, these metals were not detected in most of the WAS and digested sludge solutions, indicating that they were primarily associated with the solid fraction.

Total solids (TS), total suspended solids (TSS), total volatile solids (VS), and volatile suspended solids (VSS) were measured according to Standard Methods (American Public Health Association; American Water Works Association; and Water Environment Federation, Standard Methods for the Examination of Water and Wastewater, $19^{th}$ Ed., Washington, D.C., 1995). The protein concentration was determined by the Hartree modification of the Lowry method using bovine serum albumin as the standard (Hartree, E. F., Determination of Protein: A Modification of the Lowry Method That Gives a Linear Photometric Response, *Anal. Biochem.*, 48, 1972, 422; Lowry, O. H., Rosebrough, N. J., Farr, A. L., and Randall, R. J., Protein Measurement with the Folin Phenol Reagent, *J. Biol. Chem.*, 193, 1951, 265). Polysaccharide was measured by the Dubois method utilizing glucose as the standard (Dubois, M., Gilles, K. A., Hamilton, J. K., Rebers, P. A., and Smith, F., Colorimetric Methods for the Determination of Sugars and Related Substances, *Analytical Chem.*, 28, 1956, 350). Capillary suction time (CST) was used as measure of the sludge dewatering rate according to method 2710G of Standard Methods (APHA, 1995).

Results and Discussion

The characteristics of the waste activated sludges that were used for sludge digestion are summarized in Table 1. The solution cations, volatile and total solids, solids destruction and solution biopolymer following anaerobic and aerobic digestion for 30 days are provided in Tables 2 and 3.

TABLE 1

Characteristics of WAS Used for Digestion Studies

| Plant | SRT (day) | TS (g/L) | VS (g/L) | soluble Na$^+$ (mg/L) | soluble K$^+$ (mg/L) | soluble NH$_4^+$ (mg/L) | soluble Mg$^{2+}$ (mg/L) | soluble Ca$^{2+}$ (mg/L) | Floc Fe (mg/g ash) | Floc Al (mg/g ash) | soluble protein (mg/L) | soluble polysaccharide (mg/L) |
|---|---|---|---|---|---|---|---|---|---|---|---|---|
| A  | 28 | 18.74 | 13.91 | 579  | 27.2  | BDL  | 20.1 | 39.4 | 61  | 36  | 5.9  | 3.9  |
| B1 | 11 | 6.57  | 3.18  | 1087 | 92.6  | BDL  | 18.4 | 23.7 | 5.6 | 1.3 | 67   | 14   |
| B2 | 11 | 8.47  | 4.99  | 977  | 116   | BDL  | 17.9 | 37.2 | 9.2 | 1.6 | 32   | 7.2  |
| C  | 4  | 8.32  | 6.69  | 67.6 | 71.7  | 49.3 | 25.0 | 24.8 | 66  | 66  | 22   | 13   |
| D  | 23 | 6.77  | 5.49  | 93.8 | 11.4  | BDL  | 13.5 | 34.2 | 31  | 31  | 1.2  | 4.3  |
| E  | 7  | 8.87  | 4.87  | 324  | 32.8  | 51.6 | 44.5 | 339  | 88  | 4.3 | 17   | 13   |
| F1 | 3  | 5.57  | 4.57  | 71.2 | 10.1  | 2.4  | 7.7  | 26.0 | 33  | 75  | 3.1  | 2.5  |
| F2 | 3  | 5.22  | 3.85  | 89.3 | 10.4  | 0.2  | 6.1  | 25.9 | 36  | 102 | 0.7  | 2.4  |
| G  | 5  | 6.54  | 5.18  | 129  | 48.4  | 39.5 | 14.9 | 29.3 | 73  | 45  | 18   | 11   |

BDL = below the detection limit

TABLE 2

Chemical Content of Sludge Following Anaerobic Digestion for 30 Days

| Sludge | TS (g/L) | VS (g/L) | VS reduction (%) | soluble Na$^+$ (mg/L) | soluble K$^+$ (mg/L) | soluble NH$_4^+$ (mg/L) | soluble Mg$^{2+}$ (mg/L) | soluble Ca$^{2+}$ (mg/L) | soluble protein (mg/L) | soluble polysaccharide (mg/L) |
|---|---|---|---|---|---|---|---|---|---|---|
| A  | 15.34 | 10.94 | 21  | 601  | 104  | 359  | 4.5  | 23.9 | 250 | 29.3 |
| B1 | 6.49  | 3.14  | 1.3 | 1120 | 110  | 22.4 | 16.8 | 48.4 | 86  | 12.4 |
| B2 | 7.96  | 4.61  | 7.6 | 1003 | 135  | 52.5 | 14.9 | 55.4 | 91  | 14.2 |
| C  | 4.96  | 3.48  | 48  | 69.4 | 86.2 | 367  | 6.9  | 22.7 | 181 | 14.0 |
| D  | 5.24  | 4.04  | 26  | 95.8 | 45.4 | 189  | 16.9 | 45.6 | 115 | 14.2 |
| E  | 6.52  | 2.65  | 46  | 332  | 67.5 | 313  | 50.1 | 167  | 154 | 8.8  |
| F1 | 4.17  | 3.13  | 32  | 72.7 | 44.8 | 193  | 11.4 | 28.2 | 109 | 9.9  |
| G  | 4.86  | 3.24  | 37  | 125  | 72.2 | 253  | 7.4  | 33.8 | 119 | 11.6 |

TABLE 3

Chemical Content of Sludge Following Aerobic Digestion for 30 Days

| Sludge | TS (g/L) | VS (g/L) | VS reduction (%) | soluble Na$^+$ (mg/L) | soluble K$^+$ (mg/L) | soluble NH$_4^+$ (mg/L) | soluble NO$_3^-$ (mg/L) | soluble Mg$^{2+}$ (mg/L) | soluble Ca$^{2+}$ (mg/L) | soluble protein (mg/L) | soluble polysaccharide (mg/L) |
|---|---|---|---|---|---|---|---|---|---|---|---|
| A  | 13.96 | 9.24 | 34 | 550  | 77  | 194 | 320 | 61 | 184 | 42.8 | 62.1 |
| B1 | 5.14  | 1.97 | 38 | 1190 | 123 | BDL | 89  | 20 | 73  | 34.5 | 15.4 |
| B2 | 7.14  | 3.77 | 24 | 980  | 134 | BDL | 154 | 28 | 113 | 30.3 | 31.2 |
| C  | 5.06  | 3.27 | 51 | 68   | 73  | 116 | 181 | 45 | 112 | 30.1 | 37.3 |
| D  | 4.59  | 3.27 | 40 | 95   | 41  | 128 | 226 | 35 | 155 | 24.7 | 58.7 |
| E  | 6.30  | 2.46 | 49 | 329  | 52  | 44  | 191 | 54 | 455 | 35.5 | 57.6 |
| F1 | 3.67  | 2.66 | 42 | 75   | 52  | 134 | 205 | 36 | 116 | 19.6 | 33.5 |
| F2 | 4.75  | 3.22 | 16 | 95   | 23  | 23  | 157 | 17 | 117 | 6.7  | 7.3  |
| G  | 5.32  | 3.39 | 35 | 121  | 59  | 119 | 274 | 45 | 185 | 16.5 | 40.6 |

BDL = below the detection limit

Figure 2:
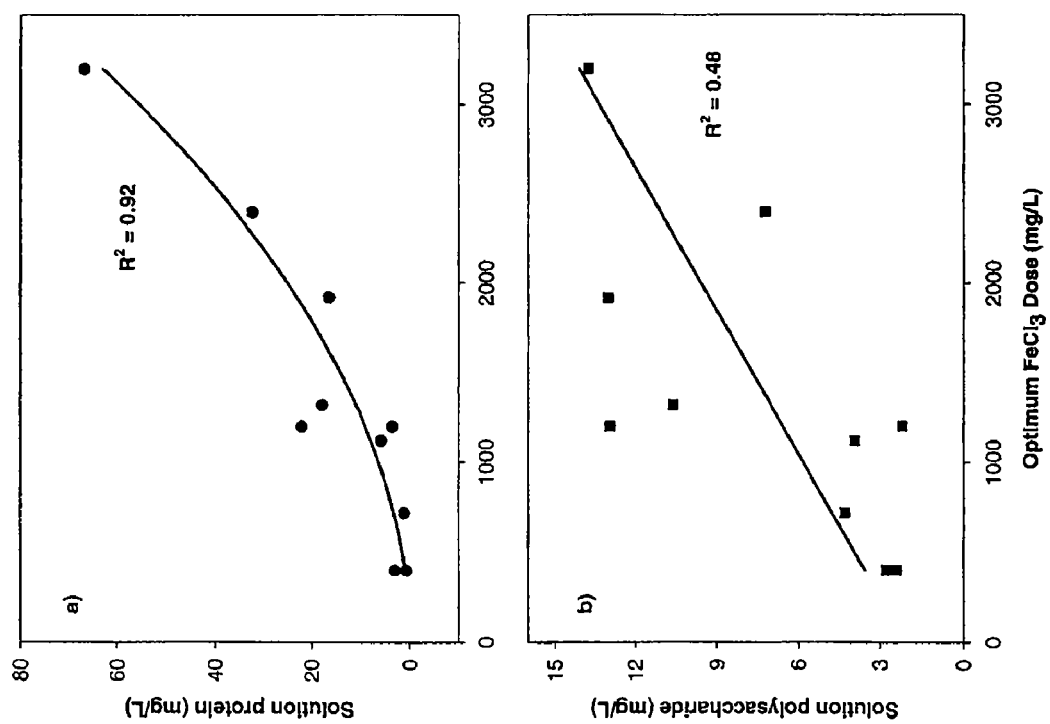
FIG. 2 is a comparison of optimum $FeCl_3$ dose with a) solution protein and b) solution polysaccharide for ten WAS samples.

The Role of Fe and Na$^+$ in Anaerobic Digestion. Comparison of data in Table 1 and Table 2 shows that the most significant changes in sludge characteristics for anaerobic digestion are increases in solution protein and NH$_4^+$. Such increases have been previously attributed to the strong affinity of protein for Fe (III) in activated sludge floc. When Fe (III) is reduced under anaerobic conditions, floc-associated protein is released, resulting in deflocculation of sludge and an increase in solution protein. The data obtained from chemical conditioning of WAS with Fe (III) salts also indirectly suggests that there is a preferential binding between protein and Fe (III) in activated sludge floc. FIG. 2 shows that the optimum dose of ferric iron salts was mainly determined by solution protein in activated sludges. Similar results have shown that Fe (III) salts selectively coagulate solution protein in sludges from autothermal thermophile aerobic digesters. A comparison of the efficiencies of Fe (III) and Fe (II) salts for coagulation of solution protein in activated sludge suggested that the former worked more effectively than the latter. Therefore, Fe reduction during anaerobic digestion may be detrimental in terms of sludge conditioning and dewatering. However, Fe reduction may be necessary for solubilization of floc-associated proteins so that they become available for biological degradation. The reduction of Fe (III) was immediately initiated when activated sludge was stored under anaerobic conditions. Therefore, Fe reduction appears to be a necessary first step in the anaerobic degradation of waste activated sludge.

Figure 3:
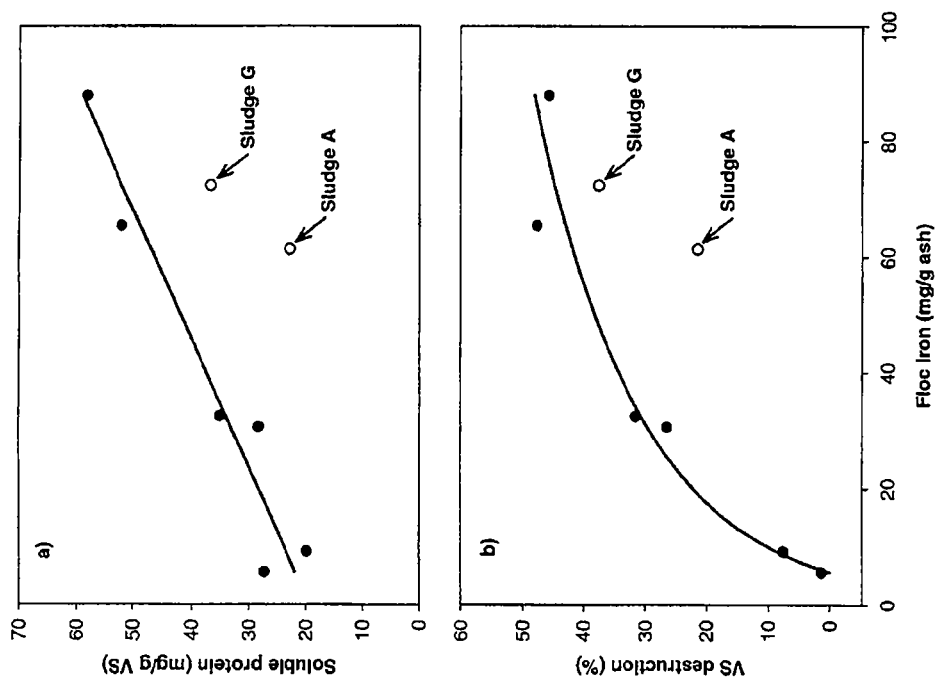
FIG. 3 shows the relationships between floc Fe and a) solution protein in anaerobically digested sludges and b) % VS destruction by anaerobic digestion. The trend lines were obtained without using Sludge A and G data.
Figure 4:
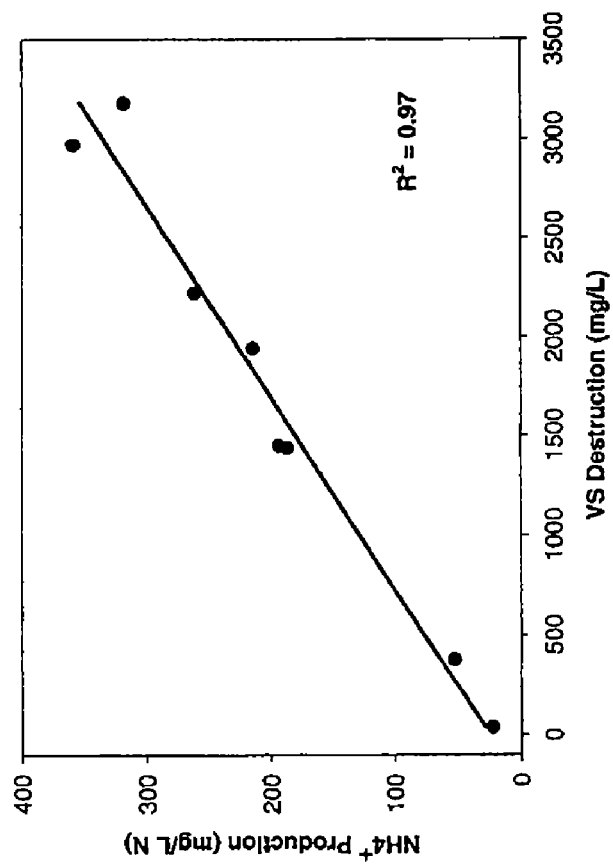
FIG. 4 shows the relationship between $NH_4^+$ production and mass of VS reduced by batch anaerobic digestion.
Figure 5:
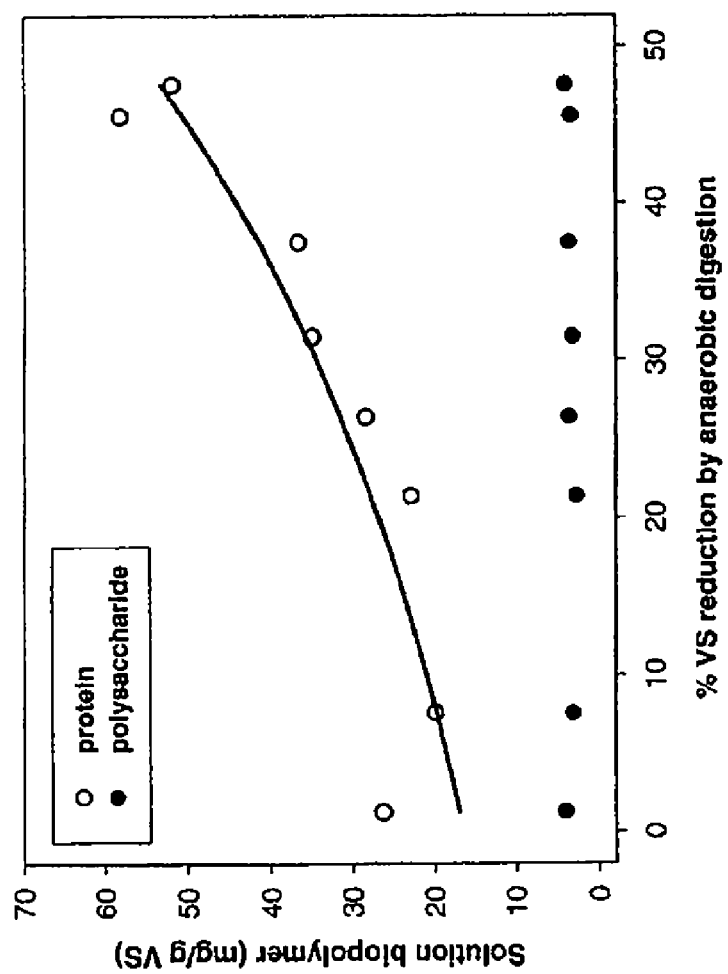
FIG. 5 is a comparison of solution protein and polysaccharide in batch anaerobically digested sludges with % VS reduction.

In order to verify if floc Fe in eight WASs could explain differences in the response to anaerobic conditions, several parameters were compared with floc Fe. As shown in FIG. 3, the concentrations of solution protein in anaerobically digested sludges and the percent VS reduction were both affected by the Fe content of activated sludge floc. In general, as floc Fe increased, more protein was found in solutions and more VS destruction occurred. The increase in $NH_4^+$ can be used as an indication of the degradation of protein. Data in FIG. 4 show that $NH_4^+$ production is strongly associated with VS destruction in anaerobic digestion (Production of $NH_4^+$ =0.1 VS destruction+24.6). In addition, FIG. 5 illustrates that the % VS reduction by anaerobic digestion is well correlated with protein in solution. The polysaccharide concentration changed very little across the digesters. These data show that Fe-associated protein was released during anaerobic digestion and while some of the protein remains in solution influencing dewatering behavior, most of the protein was degraded, accounting for much of the VS destruction.

Figure 6:
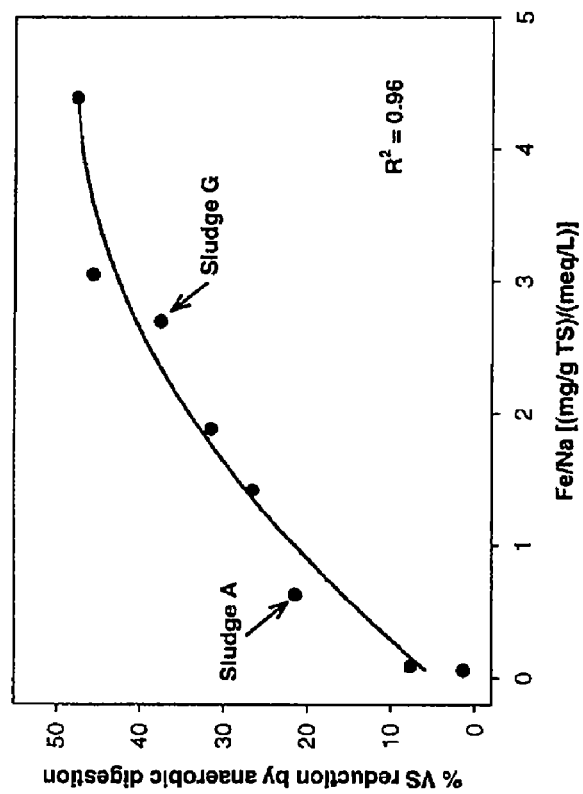
FIG. 6 shows the relationship between floc Fe and $Na^+$ (Fe/Na) and VS destruction by anaerobic digestion.

In order to determine why Sludges A and G, despite relatively high floc Fe, did not fit the pattern of the other sludges in FIG. 3, the data in Table 1 was considered. Although WAS A had a high sludge age that might have made the sludge less degradable, WAS G had a low sludge age. However, a high solution $Na^+$ concentration was found in both WAS A and WAS G. The negative impact of $Na^+$ on effluent quality has been previously reported. The high concentration of influent $Na^+$ would likely lead to the loss of protein in the effluent and therefore, this protein would not be available for degradation during anaerobic digestion. In order to assess the impact of $Na^+$ on VS reduction by anaerobic digestion, a combination of floc Fe and $Na^+$ (Fe/Na) was compared to VS reduction to see if this could explain the VS reduction. The relationship between Fe/Na and % VS reduction is shown in FIG. 6 and indicates that VS destruction under anaerobic conditions is influenced by both Fe and $Na^+$. Although there may be better ways to account for the deflocculating characteristics of $Na^+$ and resulting loss of degradable biopolymer, FIG. 6 appears to provide a simple means for evaluating the potential for VS destruction by anaerobic digestion.

Figure 7:
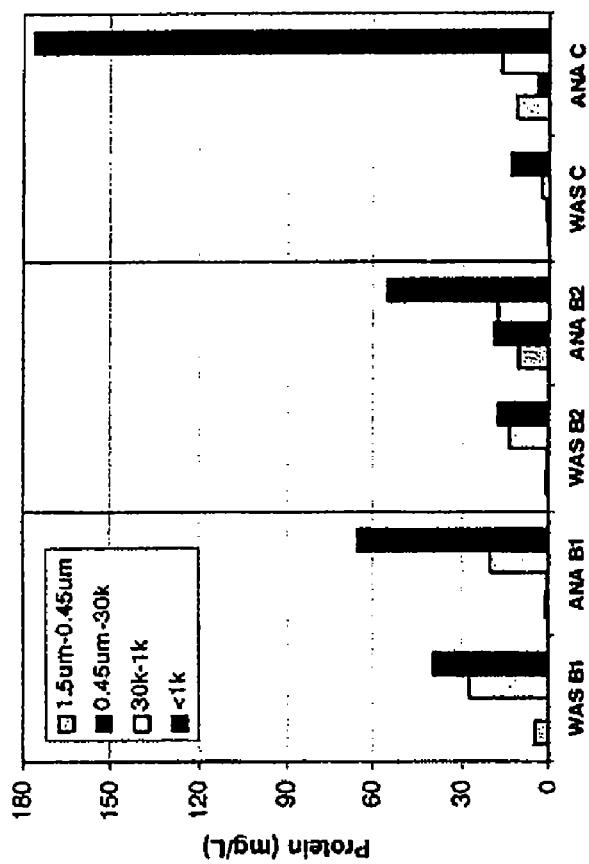
FIG. 7 is a comparison of different molecular weight fractions of protein before and after anaerobic digestion (WAS=waste activated sludge; ANA=anaerobically digested sludge).

Sludges B1 and B2, the two sludges with the lowest VS destruction, lowest floc Fe and highest $Na^+$, were very different from other sludges with regard to their digestibility under anaerobic conditions. These sludges were not as odorous as others and the sludge did not turn black, even after 30 days under anaerobic conditions. Solution protein and $NH_4^+$ following digestion did not differ significantly from the predigested sludges. Analysis of molecular weight distribution of solution protein showed that protein in each molecular fraction changed little for the sludges from plant B. For all other anaerobically digested sludges, there was significant increase in protein in the size less than 1 k Dalton. These data are graphically shown in FIG. 7 with examples of Sludge B1, B2 and C. While toxicity could have accounted for the poor digestibility of WAS B1 and B2, these two sludges digested well aerobically (Tables 2 and 3), suggesting that toxicity was not a problem. These data suggest that the lack of Fe-bound protein due to low floc Fe, coupled with loss of biopolymer in the effluent due to the high $Na^+$ accounted for the low VS destruction. Little material that can be digested anaerobically was expected to remain in these activated sludge flocs.

Changes in other soluble cations were also analyzed before and after anaerobic digestion. As the data in Tables 1 and 2 illustrate, there was little change in $Na^+$, but $K^+$ increased in all digested sludges. This suggests cell lysis, since bacterial cytoplasm contains high concentrations of $K^+$. However, no relationship between the increase in K+ and any other parameters of sludge digestibility was found. Small decreases in $Mg^{2+}$ and $Ca^{2+}$ occurred in most of the sludges following anaerobic digestion.

There was no relationship between floc Al and VS destruction under anaerobic conditions so the possible effects of Al on anaerobic digestion could not be determined from this approach.

The Role of Divalent Cations in Aerobic Digestion. The changes in solution biopolymer and cations following aerobic digestion were very different from those occurring by anaerobic digestion. By comparing the data in Tables 2 and 3, it can be seen that the major differences between anaerobically and aerobically digested sludges are a much higher divalent cation and polysaccharide concentration in aerobically digested sludges along with a much lower solution protein content. The accumulation of polysaccharide in aerobically digested sludges has previously been associated with the loss of glucosidase activity during aerobic digestion, coupled with the release of polysaccharide from the floc.

Figure 8:
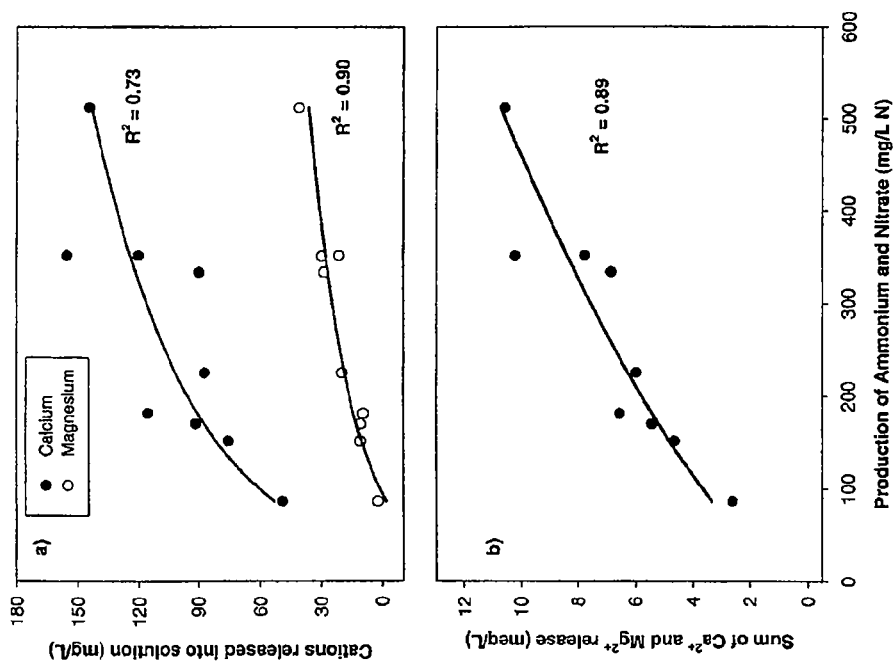
FIG. 8 shows the relationships between a) $Ca^{2+}$ and $Mg^{2+}$ release and inorganic nitrogen production and between b) the sum of divalent cation release and inorganic nitrogen production in aerobic digestion.

The increases in soluble $Ca^{2+}$ and $Mg^{2+}$, expressed as milliequivalents so cations can be compared on a charge equivalent basis, suggest that organic matter associated with these cations in floc was degraded during aerobic digestion. The greatest cation release occurred for Sludge F2 [3.11 meq (Ca+Mg)/g VSS reduced], while the least was for Sludge C [1.41 meq/g VSS reduced]. If the release of $Ca^{2+}$ and $Mg^{2+}$ is caused by the floc degradation, it should be related to parameters of sludge digestibility such as % VS or VSS reduction and inorganic nitrogen production. The percentage of organic nitrogen in sludge solids for both the feed and aerobically digested sludge has been shown to be constant during aerobic digestion, indicating that % organic nitrogen mineralized is equivalent to % VSS destroyed. FIG. 8 shows that the sum of $Ca^{2+}$ and $Mg^{2+}$ released was well correlated with inorganic nitrogen (sum of $NH_4^+$ and $NO_3^-$) production, indicating that the release of free $Ca^{2+}$ and $Mg^{2+}$ was accompanied by the degradation of nitrogenous organic matter. FIG. 8 also shows that the alginate model is not sufficient to explain the release of $Mg^{2+}$ with the production of inorganic nitrogen in aerobic digestion. Both $Ca^{2+}$ and $Mg^{2+}$ appear to play an equivalent role in binding negatively charged biopolymer and contribute to the structure of floc.

Figure 9:
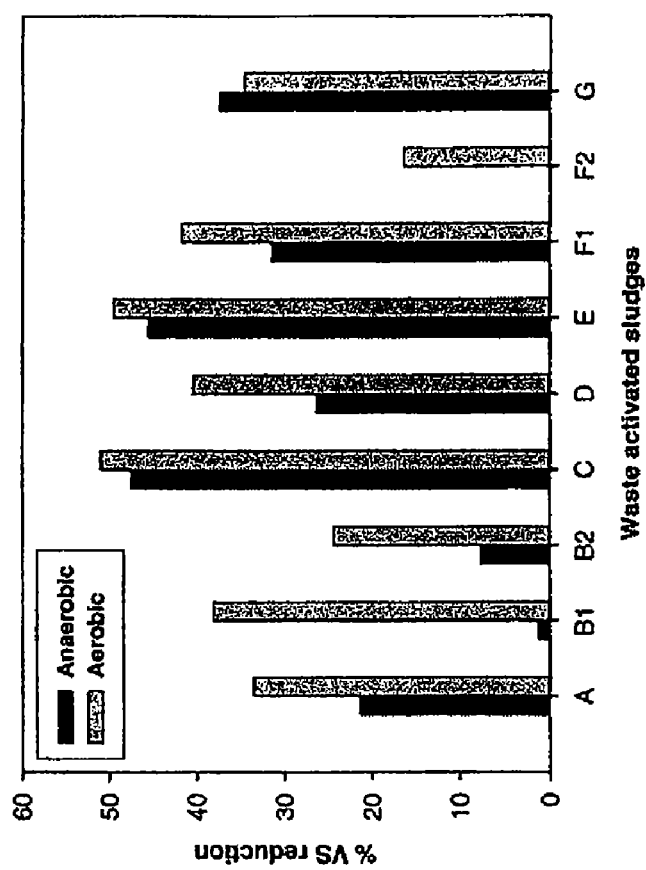
FIG. 9 shows the % VS destruction obtained by anaerobic and aerobic digestion using nine different WASs. Anaerobic digestion data for WAS F2 was not available.

Two important observations can be made from these results. First, it appears that there is a difference in at least some of the material that is degraded under aerobic and anaerobic conditions. This would explain why the sludge digestibility under the two conditions is different, even for the same WAS. As shown in FIG. 9, while sludges like WAS C, E and G were well digested under both anaerobic and aerobic conditions, the rest of sludges showed quite different VS destruction. Second, the accumulation of polysaccharide, the release of $Ca^{2+}$ and $Mg^{2+}$ and the degradation of nitrogen-containing organic matter suggests that the major fraction of floc degraded during aerobic digestion is lectin-like protein. Activated sludge flocs appear to contain proteins with lectin activity that are cross-linked with polysaccharides and both $Mg^{2+}$ and $Ca^{2+}$ provide bridging to this biopolymer network. These lectin-like proteins may be degraded and the polysaccharides linked to them may be released during aerobic conditions.

No relationship between % VSS reduction and either inorganic nitrogen production or cation release for the aerobically digested sludges was obtained. This may be due to the differential degradation between protein and polysaccharides. That is, while both the protein and polysaccharide are released into solution during aerobic digestion, only protein appears to undergo nearly complete degradation, while polysaccharide degradation is variable.

Inorganic nitrogen data in Table 3 also shows that nitrification occurs during batch aerobic digestion. Nitrification can cause the pH to continuously drop to less than 4 due to the alkalinity consumption during nitrification. $Ca^{2+}$ and $Mg^{2+}$ are relatively easily extracted from floc at this low pH. Therefore, some of the total divalent cation release into solution might also be the result of weakly acidic conditions that result from nitrification and this might also affect polysaccharide degradation.

While anaerobic digestion data indicate that the divalent cation-associated biopolymer was not degraded under anaerobic conditions since $Ca^{2+}$ and $Mg^{2+}$ did not increase, it could not be determined if either Fe or Al-bound biopolymer was degraded during aerobic digestion.

Combined Sequential Digestion. Combined sequential digestion was carried out to see if trends in cation and biopolymer release for single digestion would also occur under combined digestion. Initially, WAS from plant H was digested anaerobically for 31 days, then a portion of the anaerobic sludge was transferred to an aerobic digester and further digested aerobically while the other portion continued to digest under anaerobic conditions. As the data in FIG. 10 show, the second stage of aerobic digestion for Sludge H resulted in an additional 10% VS destruction while further digestion under anaerobic conditions resulted in less than a 4% increase, indicating that additional VS destruction occurs by combined digestion.

Figure 10:
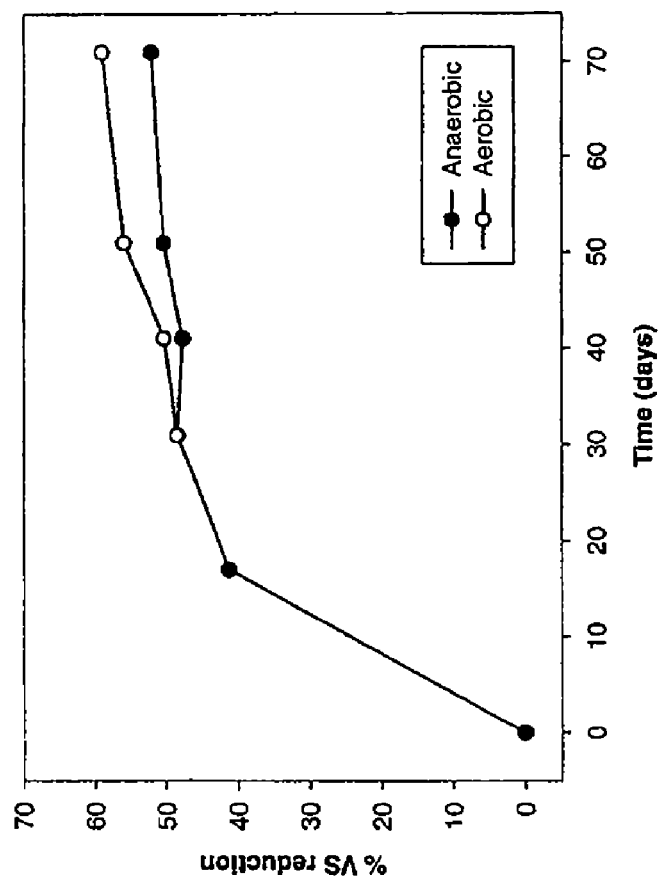
FIG. 10 shows the VS reduction by anaerobic digestion or combined anaerobic/aerobic digestion.

Based on the results from the sequential digestion shown in FIG. 10, additional sequential digestion studies were conducted, primarily to determine the changes in cations and biopolymer under each digestion environment. For these tests, WAS from plant E, a sludge with high Fe and high $Ca^{2+}$, was used. Following either anaerobic or aerobic digestion for 30 days, the digested sludges were switched, anaerobic to aerobic and aerobic to anaerobic and digested further. If a specific type of organic material is degraded under only one digestion environment, changing the digestion environment should result in further VS destruction, along with changes in solution biopolymer and cations specific to the changed digestion environment. Tables 4 and 5 illustrate how the chemical contents of interest changed after the initial and during the second stage of digestion.

TABLE 5

Sludge Characteristics of WAS E During Aerobic to Anaerobic Combined Digestion

|  | WAS | Anaerobic | Aerobic | |
|---|---|---|---|---|
|  | Day 0 | Day 30 | Day 70 | Day 87 |
| $Ca^{2+}$ (meq/L) | 16.9 | 22.7 | 17.8 | 18.2 |
| $Mg^{2+}$ (meq/L) | 3.7 | 4.4 | 4.0 | 4.2 |
| sum of divalents (meq/L) | 20.6 | 27.1 | 21.8 | 22.4 |
| $K^+$ (meq/L) | 0.8 | 1.3 | 1.4 | 1.5 |
| $Na^+$ (meq/L) | 13.0 | 13.8 | 13.6 | 13.7 |
| $NH_4^+$ (mg/L-N) | 51.6 | 44.2 | 90.9 | 99.7 |
| $NO_3^-$ (mg/L-N) | 2.3 | 191 | BDL | BDL |
| $NO_2^-$ (mg/L-N) | BDL | 17.4 | BDL | BDL |
| soluble protein (mg/L) | 16.6 | 35.5 | 35.1 | 29.2 |
| soluble polysaccharide (mg/L) | 13.0 | 57.6 | 24.5 | 19.2 |
| VS reduction (%) | — | 49.5 | 62.2 | 62.6 |
| CST (sec) | 49 | 517 | 423 | 167 |

BDL = below the detection limit

Figure 11:
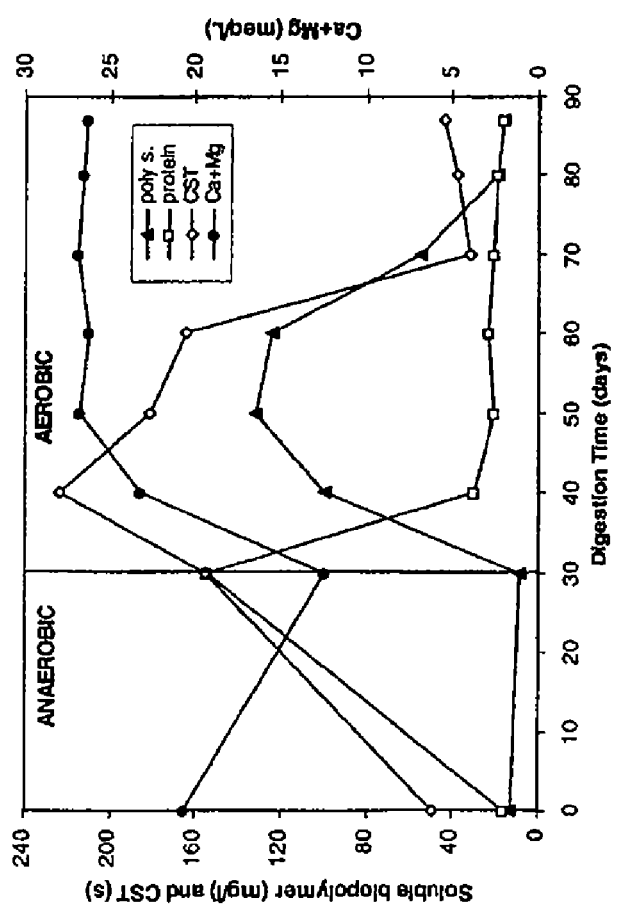
FIG. 11 shows the changes in solution biopolymer, CST, and the sum of $Ca^{2+}$ and $Mg^{2+}$ during anaerobic to aerobic combined digestion.

Anaerobic to Aerobic Digestion. Under the anaerobic phase of digestion, large increases in solution protein and $NH_4^+$ were found and VS destruction was 45.6%. Table 4 also shows that solution $K^+$ increased after initial anaerobic digestion while $Ca^{2+}$ decreased from 16.9 meq/L to 8.3 meq/L. As seen in FIG. 11, the CST increased from 49 to 155 seconds, indicating deterioration in the dewatering rate.

After changing the process to aerobic conditions, the black color disappeared over several days and the divalent cations in solution increased to concentrations in excess of the initial solution concentration, reaching their maximum at day 50. The divalent cation release is consistent with the previous observations that divalent cation-bound biopolymer is degraded during aerobic digestion but not anaerobically. Moreover, the large increase in polysaccharides along with the release of divalent cations in the aerobic phase shows the similarity between aerobic digestion alone and aerobic digestion following anaerobic digestion. As shown in FIG. 11, the solution polysaccharide concentration decreased after day 70

TABLE 4

Sludge Characteristics of WAS E During Anaerobic to Aerobic Combined Digestion

|  | WAS | Anaerobic | Aerobic | | | | | |
|---|---|---|---|---|---|---|---|---|
|  | Day 0 | Day 30 | Day 40 | Day 50 | Day 60 | Day 70 | Day 80 | Day 87 |
| $Ca^{2+}$ (meq/L) | 16.9 | 8.3 | 19.1 | 22.6 | 22.1 | 22.6 | 22.5 | 22.3 |
| $Mg^{2+}$ (meq/L) | 3.7 | 4.1 | 4.0 | 4.2 | 4.1 | 4.3 | 4.2 | 4.1 |
| sum of divalents (meq/L) | 20.6 | 12.5 | 23.2 | 26.8 | 26.3 | 26.9 | 26.6 | 26.4 |
| $K^+$ (meq/L) | 0.8 | 1.7 | 1.4 | 1.3 | 1.2 | 1.2 | 1.2 | 1.2 |
| $Na^+$ (meq/L) | 13.0 | 13.6 | 13.4 | 13.4 | 13.1 | 12.8 | 12.7 | 12.6 |
| $NH_4^+$ (mg/L-N) | 51.6 | 313 | 40.9 | 4.5 | BDL | 2.1 | BDL | BDL |
| $NO_3^-$ (mg/L-N) | 2.3 | BDL | 49.5 | 44.1 | 43.7 | 63.6 | 93.0 | 97.8 |
| $NO_2^-$ (mg/L-N) | BDL | BDL | 37.4 | 54.0 | 54.3 | 32.3 | BDL | BDL |
| soluble protein (mg/L) | 16.6 | 154 | 29.7 | 20.1 | 23.1 | 20.5 | 18.4 | 16.0 |
| soluble polysaccharide (mg/L) | 13.0 | 8.8 | 99.5 | 132 | 124 | 54.2 | 19.1 | 16.5 |
| VS reduction (%) | — | 45.6 | 51.1 | 54.0 | 56.5 | 62.2 | 56.9 | 63.1 |
| CST (sec) | 49 | 155 | 224 | 182 | 164 | 31 | 38 | 44 |

BDL = below the detection limit to a concentration less than 20 mg/L and this reduction was concomitant with the improvement in the dewatering rate as indicated by a decrease in the CST. The degradation of solution polysaccharide beyond 70 days suggests that the deterioration in dewatering properties associated with aerobic digestion would depend on the detention time, with longer detention times producing a better dewatering sludge.

The data in Table 4 and FIG. 11 show that protein and $NH_4^+$ decreased during aerobic digestion while $NO_3^-$ and $NO_2^-$ increased. Analysis of nitrogen data in Table 4 showed that approximately 200 mg/L-N of inorganic nitrogen could not be accounted for following aerobic digestion. The consumption of inorganic nitrogen could be caused by ammonia stripping, denitrification (when the system changed from anaerobic to aerobic) or nitrogen assimilation into biomass. It could not also be determined if the decrease of protein was associated with its degradation or reflocculation by re-oxidized Fe.

Aerobic to Anaerobic Digestion. Little gas production and color change was observed for the first 32 days after changing the system from aerobic to anaerobic. The nitrate (191 mg/L-N) produced during the prior aerobic digestion likely impeded the development of anaerobic conditions. Denitrification was needed and glucose was added on a stoichiometric basis to consume $NO_3^-$. The sludge turned black 6 days after adding the external organic source. This observation suggests that the performance of anaerobic digestion using aerobically digested sludge may not be practical. However, the data can still be used to show the association between cations and biopolymer in the floc structure.

Figure 12:
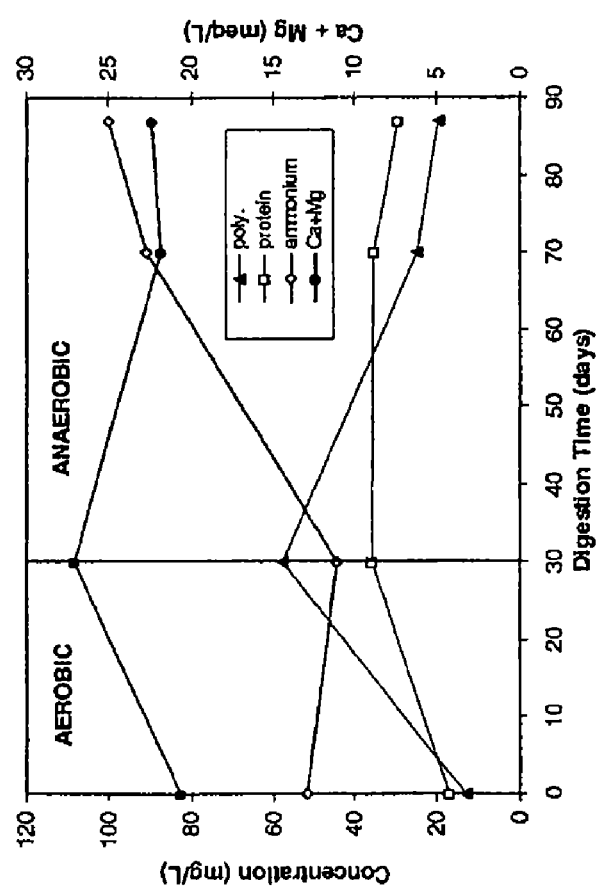
FIG. 12 shows the changes in solution biopolymer, $NH_4^+$, and the sum of $Ca^{2+}$ and $Mg^{2+}$ during aerobic to anaerobic combined digestion.

FIG. 12 shows changes in the sum of $Ca^{2+}$ and $Mg^{2+}$, solution biopolymer and $NH_4^+$ in the aerobic to anaerobic system. Both the divalent cation concentration and solution polysaccharides increased during aerobic digestion but decreased once anaerobic conditions developed. Again, these results are the same as those previously observed in separate digestion phases. The concentration of protein remained relatively constant throughout digestion, but the increase in $NH_4^+$ indicates that protein was released and degraded under anaerobic conditions. Proteins degraded during the anaerobic phase are not likely from lectin-like biopolymers since divalent cations were not released. Rather, these cations were taken up; $Ca^{2+}$ decreased from 22.7 meq/L to 18.2 meq/L and $Mg^{2+}$ from 4.4 meq/L to 4.2 meq/L.

Figure 13:
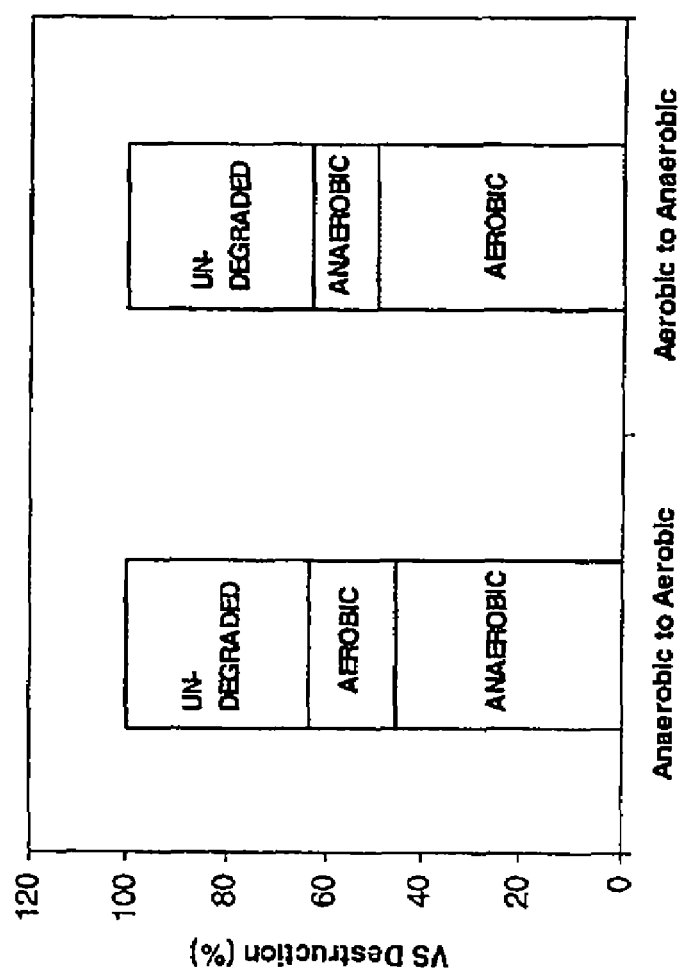
FIG. 13 shows the percent VS reduction in two series of combined digestion for Sludge E.

VS Destruction in Combined Digestion. The combined digestion results shown in FIGS. 10-12 indicate that some portions of flocs can only be digested under one digestion condition. The VS destruction for the combined digestion of WAS E is shown in FIG. 13. Initially, VS reduction in the anaerobic phase for Sludge E was 45.6% and was 49.5% in the aerobic phase. An additional 17.5% was consumed when the anaerobic digester was switched to aerobic and 13.1% when the aerobic was converted to anaerobic. Data in FIG. 13 shows that both series of combined digestion for WAS E resulted in the same percent VS reduction, 63%. It should be noted that in addition to proteins and polysaccharides, WAS also contains cell biomass, humic substances, fats and nucleic acids. Therefore, some of the material degraded under anaerobic conditions would also be expected to degrade under aerobic conditions.

The additional VS destruction under different digestion environments suggests that with either anaerobic or aerobic digestion, some degradable organic material will remain in floc. Since digestion is designed to reduce vector attraction and vector attraction depends on the amount of degradable organic matter remaining in the sludge, it can be expected that odors can be generated by both anaerobically and aerobically digested sludges since some degradable material remains after either type of digestion. Depending on the handling method and storage method used, some of this organic matter may become bioavailable, resulting in odors and vector attraction problems.

Conclusions The VS destruction of waste activated sludge by anaerobic and aerobic digestion was strongly influenced by the cation content in the sludge. Specifically, Fe was the primary factor in determining the VS destruction by anaerobic digestion, while organic matter associated with divalent cations was degraded under aerobic conditions. The data associated with cation and biopolymer release from both single and combined digestion processes suggests that some of the organic matter in floc is bound in two different ways and each is degraded under distinct digestion environments. Therefore, the evaluation of the cation content of influent and in activated sludge flocs can be used to predict digestibility of sludge. Specifically:

Protein release and degradation, likely associated with Fe reduction, accounts for VS reduction by anaerobic digestion. As the floc Fe content increases, VS destruction increases.

The influent $Na^+$ concentration also affects sludge digestibility under anaerobic conditions, with VS destruction decreasing as influent $Na^+$ increases.

The accumulation of solution polysaccharide, coupled with the release of divalent cations and production of inorganic nitrogen indicates that organic matter associated with divalent cations is the primary organic material that is degraded during aerobic digestion.

Combined digestion (anaerobic/aerobic or aerobic/anaerobic) produces additional VS destruction beyond single digestion processes.

Unique cation and biopolymer release and degradation patterns during each phase of digestion, indicate that there are some organics in waste activated sludge that are degraded only under either anaerobic or aerobic conditions.

Wastewater Treatment Systems Using Multivalent Metal Ion Management

Metal salts play a key role in digestibility of biological material as discussed above. Increasing $Fe^{3+}$ content and decreasing $Na^+$ content increases the anaerobic digestion of volatile solids. Similarly, increasing divalent cations (e.g., $Ca^{2+}$ and $Mg^{2+}$) increases the aerobic digestion of volatile solids. $Al^{3+}$ appears to inhibit the degradation of volatile solids in either anaerobic or aerobic environments.

The wastewater treatment systems outlined below provide a more efficient process for generating low-yield wastes by adding metal salts to the wastewater before or during treatment. The nature of the wastewater will determine the nature of the metal salt added and whether the wastewater will be subjected to an anaerobic environment, aerobic environment or combination thereof. In one embodiment, $Fe^{3+}$ salts are used in combination with anaerobic digestion. In another embodiment, $Ca^{2+}$ and $Mg^{2+}$ are used in combination with aerobic digestion. In yet another embodiment, $Fe^{3+}$ and $Ca^{2+}$ and/or $Mg^{2+}$ are used in combination with both anaerobic and aerobic digestion. This present invention may be embodied in many different forms and should not be construed as limited to the embodiments set forth herein.

Figure 14:
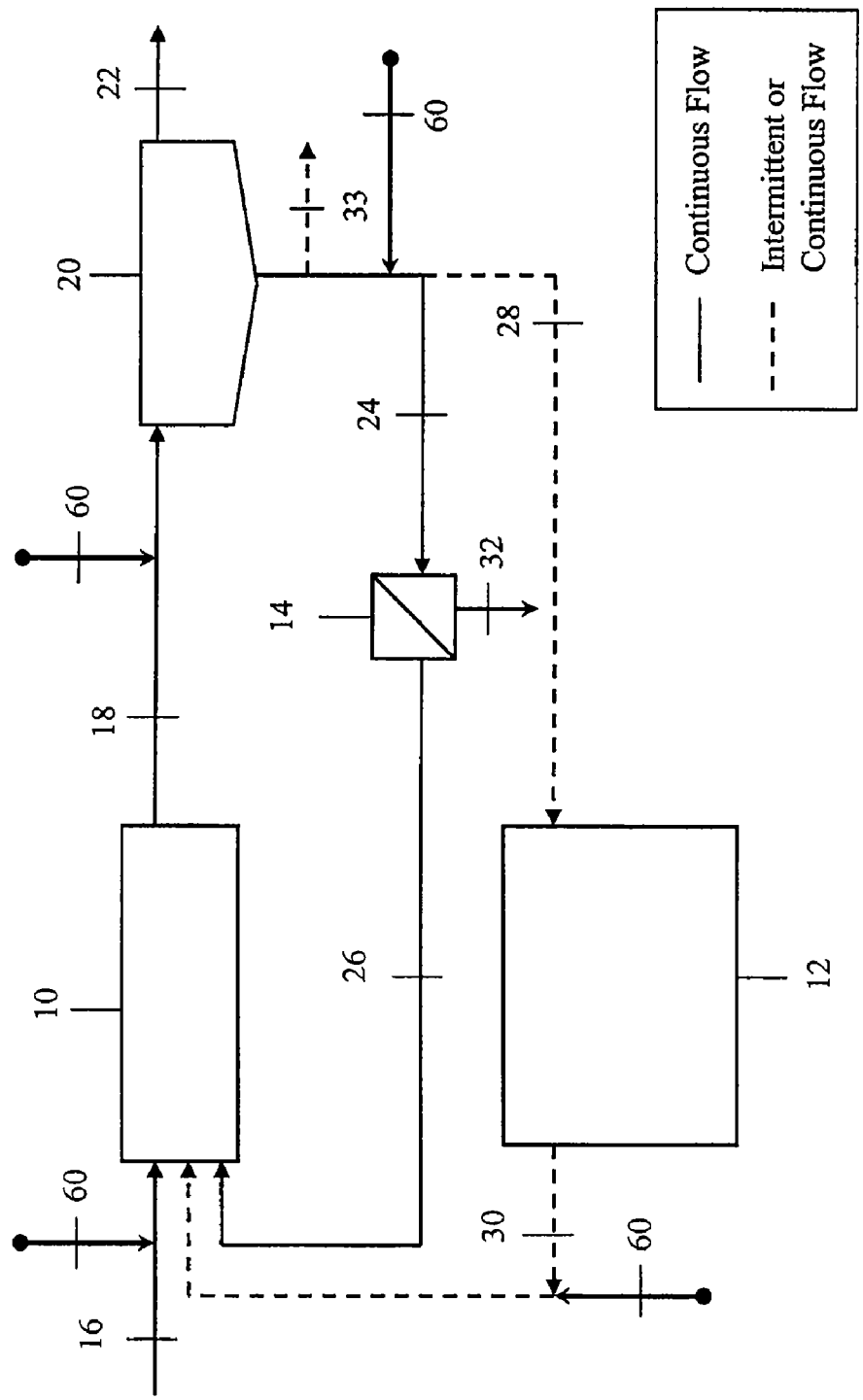
FIG. 14 is a schematic view of a first embodiment of an improved wastewater treatment system.

FIG. 14 illustrates a schematic view of an improved wastewater treatment system embodying the invention. The invention employs a mainstream reactor 10 in combination with a sidestream bioreactor 12 to minimize the WAS generated by the treatment process. Chemical dispensing devices 60 located at one or more sites throughout the system adjust the concentration of multivalent metal ions in the wastewater. A screening device 14 removes inert solids from the system.

As shown in FIG. 14, wastewater comprising organic pollutants is transported by conduit 16 to the mainstream reactor 10 where it is mixed with bacterial-laden sludge, or activated sludge, to form a mixed liquor. The mainstream reactor 10 subjects the mixed liquor to one or more biological growth conditions that cultivate microorganisms to convert readily degradable solids into carbon dioxide, water and biomass. The mainstream reactor 10 typically comprises one or more reactor zones, each of which operates under aerobic, anoxic or anaerobic conditions. Within an aerobic zone, the mixed liquor contains sufficient dissolved $O_2$ to cultivate microorganisms that undergo aerobic metabolic processes. Within an anoxic zone, the mixed liquor typically contains no measurable dissolved $O_2$ but does contain oxygen in the form of nitrates and/or nitrites. An anoxic zone will cultivate those organisms that can utilize the oxygen tied up within the nitrates and/or nitrites to carry out their metabolic processes. An anaerobic zone contains no measurable oxygen and will cultivate those organisms that do not require oxygen to carry out their metabolic processes. Although the invention should in no way be limited by scientific theory, it is believed that aerobic zone microorganisms typically oxidize readily degradable solids and simultaneously absorb and store phosphates. Anoxic zone microorganisms typically use nitrate, and optionally oxygen (aerated anoxic), to oxidize readily degradable solids. The anaerobic zone microorganisms typically convert carbon compounds using energy derived from hydrolysis.

The biological populations within the mainstream reactor 10 can be adjusted to accommodate seasonal variations in wastewater and/or treat specific pollutants by varying the number and sequence of reactor zones. The mainstream reactor 10 can be divided into a finite number of discrete zones defined by distinct boundaries. In one embodiment, the mainstream reactor 10 includes three reactor zones, where the mixed liquor is first subjected to an aerobic zone, then subjected to an anoxic zone, and finally subjected to an aerobic zone. In another embodiment, the mainstream reactor 10 includes two reactor zones, where the mixed liquor is first subjected to an aerobic zone followed by an anaerobic zone. In a further embodiment, the mainstream reactor 10 includes four reactor zones, where the mixed liquor is first subjected to an anaerobic zone, followed by an anoxic zone and two aerobic zones. The listed embodiments serve only as examples. It should be understood that the mainstream reactor 10 can comprise two or more reactor zones arranged in any sequence. Furthermore, the mainstream reactor 10 can run as a batch process or a continuous process.

The mainstream reactor 10 can also have a long plug flow design where there are no discrete boundaries and the conditions change gradually over the length of the reactor. In one embodiment, the reactor environment gradually transitions from an aerobic environment in the upstream end to an anoxic environment in the downstream end. In an alternative embodiment, the reactor environment gradually transitions from an anaerobic environment in the upstream end, to an anoxic environment in the middle, and to an aerobic environment in the downstream end.

From the mainstream reactor 10, the mixed liquor is transferred by conduit 18 to a solid-liquid separator 20 where solids are separated from the mixed liquor, leaving behind an activated sludge and a clarified effluent. In the embodiment shown in FIG. 14, the mainstream reactor 10 and solid-liquid separator 20 are separate units. In an alternative embodiment, the mainstream reactor 10 and solid-liquid separator 20 are combined in a sequencing batch reactor.

The solid-liquid separator 20 is any device that separates solids from liquids by, for example, gravity, differential settling velocity, or size-exclusion. Examples of solid-liquid separators include settling ponds, clarifiers, hydrocyclones, centrifuges, and membrane filters or separators. The clear effluent is removed by conduit 22 and can be disinfected and then discharged into a local waterway. The remaining activated sludge comprises live bacteria, expired bacteria, and inert solids.

A portion of the activated sludge from the solid-liquid separator 20 is recycled to the mainstream reactor 10 by conduits 24 and 26. The recycled sludge, also known as return activated sludge (RAS), maintains a sufficient concentration of bacterial cells in the mainstream reactor 10 to effectively treat the incoming wastewater. A portion of the activated sludge may also be transferred directly by conduit 28 to the sidestream bioreactor 12 where a second bacteria population is cultivated under one or more growth conditions to facilitate the decomposition of readily degradable solids in the wastewater treatment process. A suitable sidestream bioreactor 12 is described below and in U.S. Pat. No. 6,660,163 issued to Miklos, which is hereby fully incorporated by reference.

The bacteria population within the activated sludge typically comprises one or more classes of bacteria. Such classes of bacteria include, but are not limited to, obligate aerobes, facultative aerobes, nitrifiers, obligate anaerobes, and facultative anaerobes. Each bacteria performs a certain function. For example, some bacteria convert particulate biochemical oxygen demand (BOD) into soluble BOD for utilization, some reduce high solids yield organisms, and some improve nitrification/denitrification efficiency. Each bacteria also thrives within a particular range of conditions. Aerobic bacteria thrive in an oxygen-rich environment, anaerobic bacteria thrive in an oxygen-depleted environment, and facultative bacteria can thrive in both environments. Bacteria within a population may be selectively activated by changing the growth conditions to which the population is subjected. Desired growth conditions may be achieved by effecting a selected order of aerobic, anoxic, and anaerobic conditions for varied lengths of time and repetitively controlling those conditions by measurement and reproduction of the oxidation-reduction potential (ORP), specific oxygen uptake rate (SOUR), and/or specific nitrogen uptake rate (SNUR). Therefore, within the sidestream bioreactor 12 it is possible to treat more than one component in the wastewater by selectively varying the conditions of the sidestream bioreactor 12 to sequentially activate the individual types of bacteria.

In one embodiment, the sidestream bioreactor 12 is run under anaerobic conditions to promote the growth and activity of anaerobic bacteria. Such bacteria can include obligate anaerobes and/or facultative anaerobes. Under anaerobic conditions, the bacteria that accumulated quantities of phosphorus in excess of that required for simple cell growth and reproduction during aeration, now take up and store simple carbon compounds, using energy derived from the hydrolysis and release of phosphates. When the activated sludge is eventually returned to the mainstream reactor 10, these bacteria are able to metabolize the absorbed carbon compounds in an aerobic zone. The sidestream bioreactor 12 can operate as a batch process or as a continuous process.

In a second embodiment, the sidestream bioreactor 12 is a sequencing facultative digester (SFD) favoring a low solids yield. Within an SFD, the activated sludge comprising facultative bacteria is subjected to a sequence of anaerobic and anoxic conditions that contribute to breaking down the readily degradable solids in the wastewater treatment process. The SFD can operate as a batch process, where the entire contents of the SFD are under anoxic conditions or anaerobic conditions at a single moment. Alternatively, the SFD can operate as a continuous process where the SFD is divided into separate compartments, each compartment operating under anoxic or anaerobic conditions. The sequence of conditions may take any order.

After processing in the sidestream bioreactor 12, the activated sludge may be recycled to the mainstream reactor 10 as interchange activated sludge (IAS) by conduit 30. In one embodiment, the activated sludge is allowed to settle to the bottom of the sidestream bioreactor 12 and a portion of the liquid supernatant is returned to the mainstream reactor 10. In an alternative embodiment, activated sludge is returned to the mainstream reactor 10 without allowing the solids to settle in the sidestream bioreactor 12.

Although each of the activated sludge pathways has been described individually, it should be recognized that the activated sludge may be entirely diverted along one of the pathways or alternatively split along both pathways. Additionally, each pathway may be controlled so as to permit continuous or intermittent flow. The selected pathways and the amount of the activated sludge sent to each pathway may be adjusted as needed to most efficiently and effectively treat the wastewater entering the treatment plant at any given time. In one embodiment, about 90% of the activated sludge from the solid-liquid separator 20 is recycled to the mainstream reactor 10 and about 10% of the activated sludge from the solid-liquid separator 20 is passed through the sidestream bioreactor 12. In an additional embodiment, about 80% of the activated sludge from the solid-liquid separator 20 is recycled to the mainstream reactor 10 and about 20% of the activated sludge from the solid-liquid separator 20 is passed through the sidestream bioreactor 12.

The RAS recycled to the mainstream reactor 10 is passed through a screening device 14 to remove inert solids. A variety of organic and inorganic pollutants may be present in the wastewater. Readily degradable solids will be decomposed within the treatment plant. However, inert solids will build up in the system and effect plant efficiency if not properly removed. Screening the activated sludge will remove most inert solids from the plant while allowing biomass to be recycled within the plant. Suitable screening devices 14 may include a combination screen and hydrocyclone arrangement as described in U.S. Pat. Nos. 5,658,458, 5,626,755 and 5,824,222 issued to Keyser et al. and a screening device as described in U.S. patent application Ser. No. 11/469,009 filed Aug. 31, 2006, each of which is hereby fully incorporated by reference. Screened solids are removed from the wastewater treatment system by conduit 32.

In the embodiment represented by FIG. 14, the screening device 14 filters RAS recycled to the mainstream reactor 10 by conduits 24 and 26. However, it should be recognized by those skilled in the art that the screening device 14 may be located elsewhere within the wastewater treatment system. For example, the screening device 14 may be located upstream of the mainstream reactor 10, between the mainstream reactor 10 and solid-liquid separator 20, or employed "in-situ" within the mainstream reactor 10. Additionally, the wastewater treatment system may comprise two or more screening devices 14 located at one or more sites within the wastewater treatment system.

Although the screening device removes a significant portion of inert solids in a wastewater stream, it does not remove 100% of the inert solids. As a result, inert solids may build up in the processing tanks over time. Therefore, conduit 33 provides a means for periodic wasting of the sludge to prevent the build-up of inert solids in the wastewater treatment system. The period between sludge wasting will depend upon a number of factors that include, but are not limited to, the nature of the incoming wastewater, the treatment process and the time of year. For example, a wastewater treatment plant may waste sludge every month, every six months or once a year. Additionally, a wastewater treatment plant may waste all of the sludge or just a portion of the sludge at any given time. Although the location of wasting in FIG. 14 is directly after the solid-liquid separator 20, it should be understood that wasting may occur at any point in the wastewater treatment process.

Chemical dispensing devices 60 are located at one or more sites within the wastewater treatment system to adjust the multivalent metal ion concentration within the wastewater. As discussed above, anaerobic and aerobic digestion appears to be strongly influenced by the metal cation content in wastewater sludge or flocculent. $Fe^{3+}$ appears to enhance the degradation of volatile solids in an anaerobic environment. Divalent metal ions (e.g., $Ca^{2+}$ and $Mg^{2+}$) appear to enhance the degradation of volatile solids in an aerobic environment. By coordinating the type and concentration of metal ion in the wastewater with the operating conditions in the treatment system, the amount of WAS generated by the wastewater treatment system may be minimized.

In FIG. 14, a chemical dispensing device 60 may add multivalent metal ions to the influent prior to treatment in the mainstream reactor 10. The metal ions are added as metal salts and may be dispensed into the wastewater using methods known to those skilled in the art. In one embodiment, the dispensing device 60 is a chemical metering pump. The metal salts may be added to the wastewater in the form of a solid, a slurry or a solution. Any metal cation that is cost effective and nontoxic may be used. Sources of $Fe^{3+}$ may include $FeCl_3$ and $Fe_2(SO_4)_3$. Sources of divalent metal ions may include $Mg(OH)_2$, $MgCl_2$, $CaO$, $Ca(OH)_2$ and $CaCl_2$.

The amount of metal salt added to the influent wastewater will depend upon the concentration of influent BOD. Metal salt may be added to the influent so that the ratio (by weight) of metal ions to BOD in the wastewater is at least about 1:400, particularly at least about 1:100, and more particularly at least about 1:50. Furthermore, the metal salt may be added to the influent so that the ratio (by weight) of metal ions to BOD is less than or equal to about 1:25, particularly less than or equal to about 1:75, and more particularly less than or equal to about 1:200. This includes embodiments where the metal salt is added to the influent so that the ratio (by weight) of metal ions to BOD in the wastewater is about 1:400 to about 1:25, particularly about 1:300 to about 1:50, and more particularly about 1:100 to about 1:50.

In one embodiment, an influent stream containing 200-300 mg/L BOD is treated downstream in an anaerobic environment. A sufficient amount of iron salt is added to the influent to bring the $Fe^{3+}$ concentration in the wastewater up to about 0.5 to about 6 mg/L. This includes $Fe^{3+}$ concentrations of about 0.5 mg/L, about 3 mg/L, and about 6 mg/L.

In FIG. 14, chemical dispensing devices 60 are illustrated at various location within the wastewater treatment system. Such locations may include upstream of the mainstream reactor 10, between the mainstream reactor 10 and solid-liquid separator 20, just downstream of the solid-liquid separator 20, and downstream of the sidestream bioreactor 12. It should be understood that the wastewater treatment system may contain any number of chemical dispensing devices 60 located at one or more sites within the wastewater treatment system. The chemical dispensing devices 60 may operate continuously or intermittently. The chemical dispensing devices 60 may dispense $Fe^{3+}$ ions, $Ca^{2+}$ and/or $Mg^{2+}$ ions, or combinations thereof, depending upon the composition of the wastewater and conditions in the mainstream reactor 10 and sidestream bioreactor 12.

Figure 15:
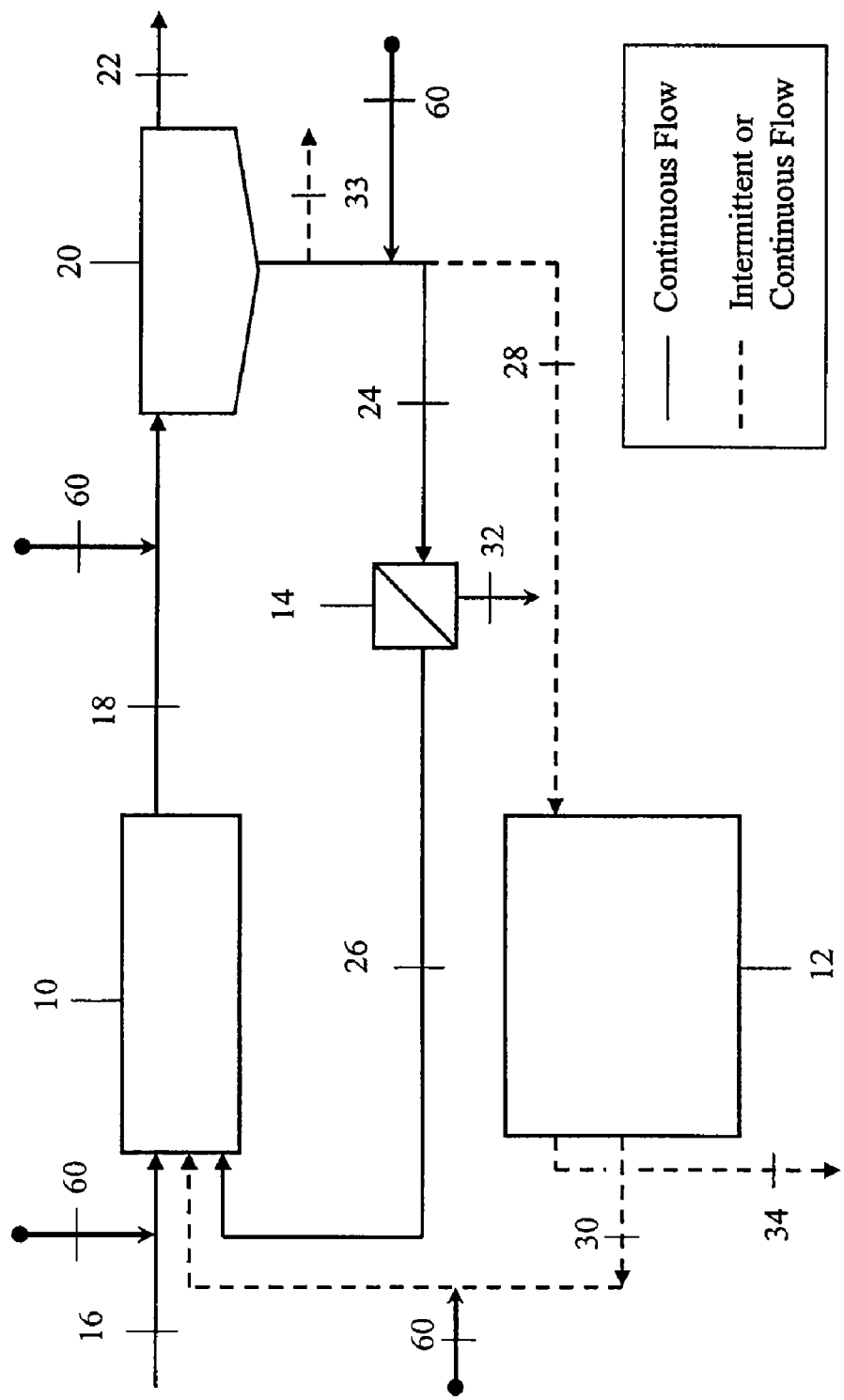
FIG. 15 is a schematic view of a second embodiment of an improved wastewater treatment system.
Figure 16:
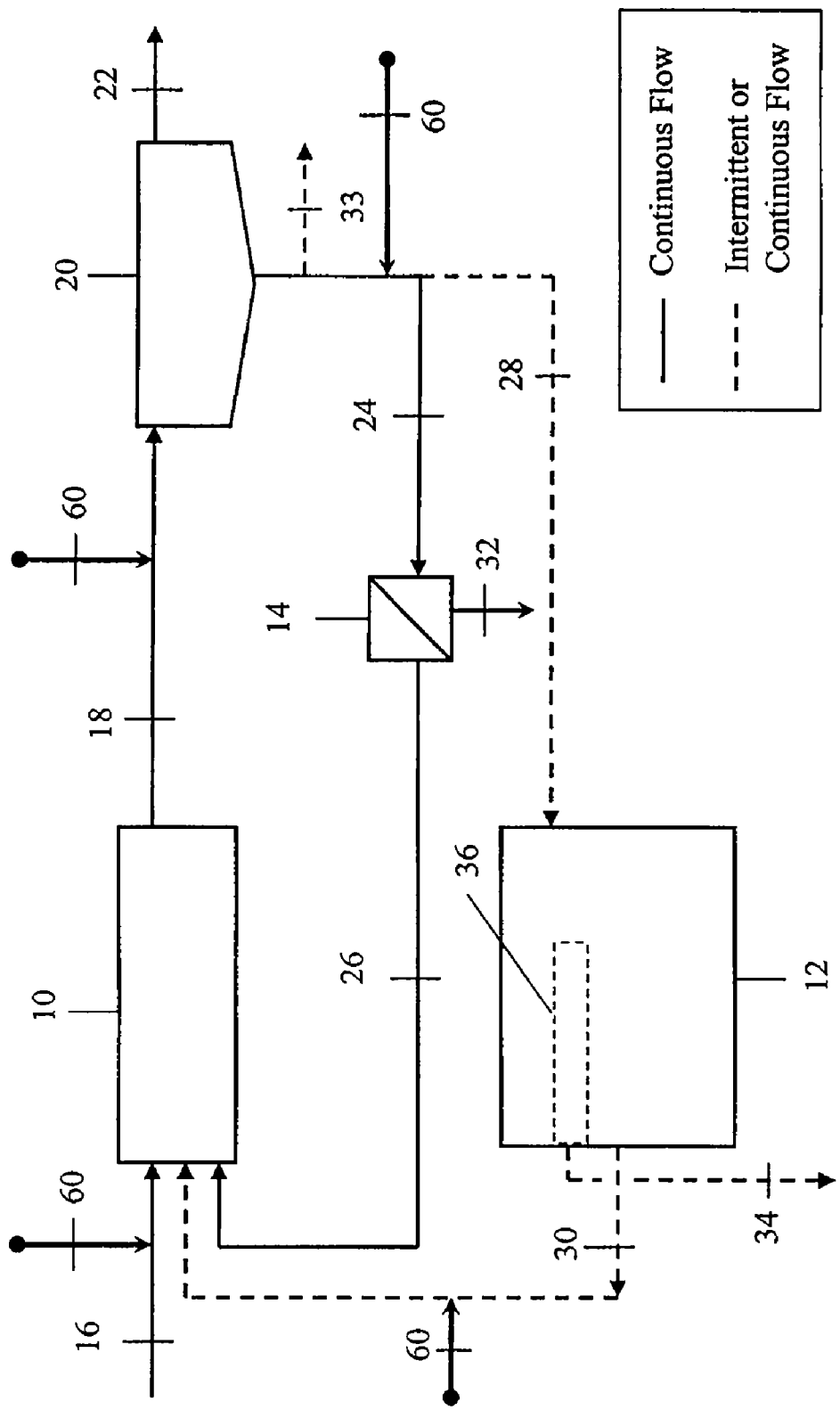
FIG. 16 is a schematic view of a third embodiment of an improved wastewater treatment system.

FIGS. 15-16 represent a variation on the embodiment illustrated in FIG. 14. Accordingly, with the exception of mutually inconsistent features and elements between the embodiments of FIGS. 15-16 and the embodiment of FIG. 14, reference is hereby made to the description above accompanying the embodiment of FIG. 14 for a more complete description of the features and elements (and the alternatives to the features and elements) of the embodiments of FIGS. 15-16.

In the embodiment illustrated in FIG. 15, the activated sludge is allowed to settle in the sidestream bioreactor 12 creating a dense bottom layer and a relatively less dense top layer ("supernatant"). The supernatant is removed from the wastewater treatment system by conduit 34 and may be put to beneficial use in other applications. Alternatively, the supernatant may be disposed of in a sewer or an off-site disposal area. At least a portion of the dense bottom layer is returned by conduit 30 to the mainstream reactor 10 as interchange activated sludge (IAS).

In the embodiment illustrated in FIG. 16, a membrane unit 36 is submerged in the activated sludge within the sidestream bioreactor 12 creating a membrane bioreactor. The membrane unit 36 is typically a hollow piece comprising a porous membrane surface. A vacuum inside the hollow piece creates a pressure gradient, enabling treated water to pass through the porous membrane surface and out the sidestream bioreactor 12 by conduit 34. The water ("permeate") removed by the membrane unit 36 may be put to beneficial use in other applications or disposed of in a sewer or an off-site disposal area.

In one embodiment the membrane unit 36 has a nominal pore size of 0.04 μm and is comprised of an inner reinforcing structure covered with a non-ionic, hydrophilic polymeric material. The membrane is approximately 0.8 m long, provides 0.93 m² of surface area, has a permeate header located at the top of the unit, and is continuously aerated at the base to provide turbulence at the fiber surface. A vacuum inside the hollow fiber creates a pressure gradient, enabling permeate to pass across the membrane. Every 10 minutes, the flow is reversed for about 30 seconds to force permeate back through the porous membrane surface in an effort to reduce particulate accumulation on the membrane surface. Commercially available membrane systems include Memcor Model B30R (available from Siemens Water Technologies of Waukesha, Wis.). Other suitable membrane systems are known to those skilled in the art.

At least a portion of the activated sludge remaining in the sidestream bioreactor 12 is returned by conduit 30 to the mainstream reactor 10 as interchange activated sludge (IAS).

Figure 17:
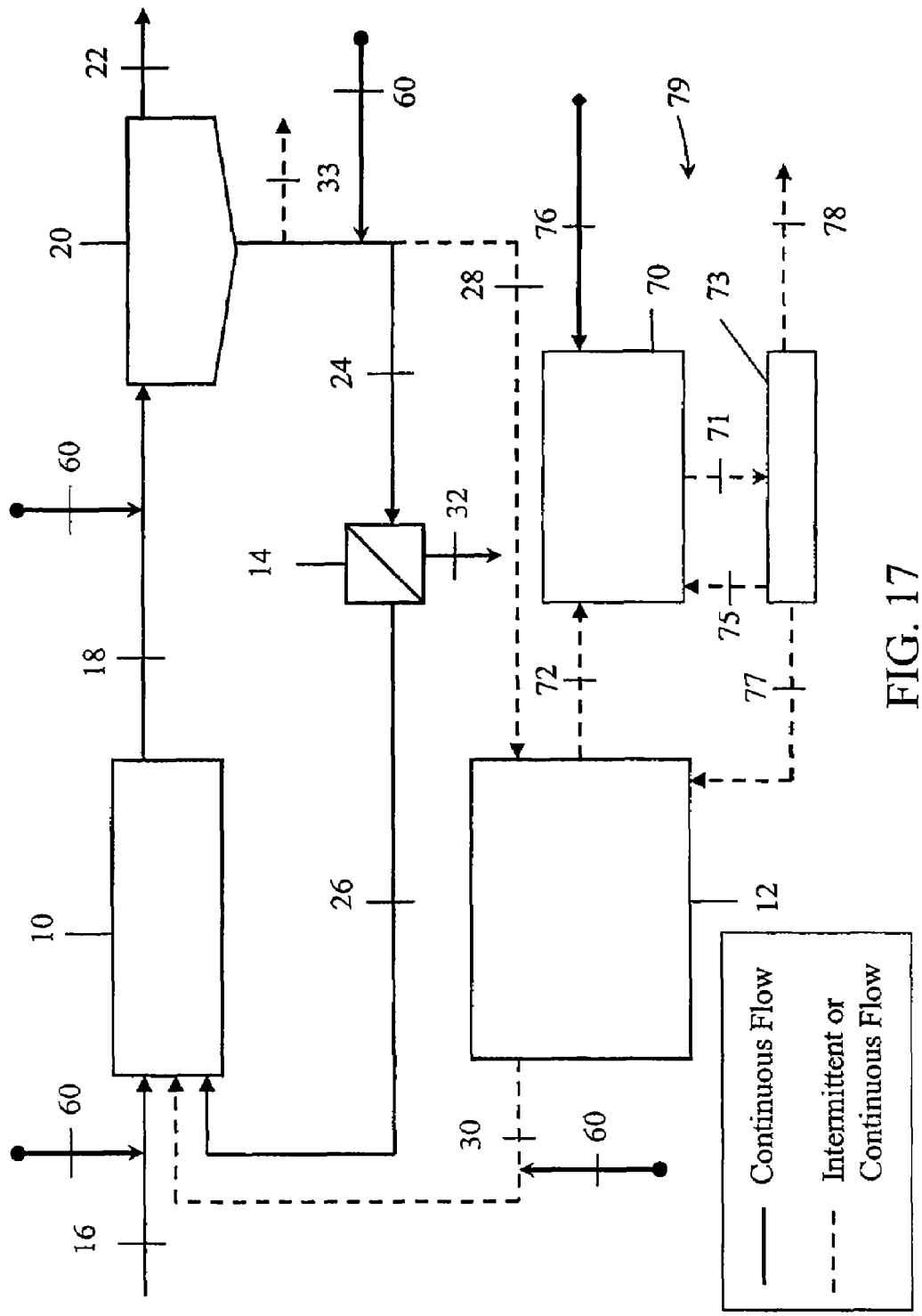
FIG. 17 is a schematic view of a fourth embodiment of an improved wastewater treatment system.

FIG. 17 represents a variation on the embodiment illustrated in FIG. 14. Accordingly, with the exception of mutually inconsistent features and elements between the embodiment of FIG. 17 and the embodiment of FIG. 14, reference is hereby made to the description above accompanying the embodiment of FIG. 14 for a more complete description of the features and elements (and the alternatives to the features and elements) of the embodiment of FIG. 17.

In the embodiment illustrated in FIG. 17, a phosphorus removal system 79 is used to remove or reduce the level of phosphorus in the activated sludge stream. Phosphates are a common nutrient found in organic material making up WAS. As wastewater is subject to various treatment stages, the phosphates are either solubilized in the wastewater or taken up by microorganisms in the sludge. During a conventional activated sludge process, the phosphates are taken up by the microorganisms in the sludge and removed with the WAS. In the absence of WAS, the phosphates remain in the effluent as potential environmental pollutants. A phosphorus removal system 79 is employed to remove phosphorus from the activated sludge stream through the formation and removal of solid phosphates. A suitable phosphorus removal system 79 is described below and in U.S. patent application Ser. No. 11/170,864 filed on Jun. 30, 2005, which is hereby fully incorporated by reference.

Prior to phosphorus removal, the activated sludge in the sidestream bioreactor 12 is typically subjected to at least one anaerobic environment to facilitate the release of phosphates by bacteria into solution. A portion of the activated sludge from the sidestream bioreactor 12 is then fed by conduit 72 to the phosphorus precipitation tank 70. Within the phosphorus precipitation tank 70, the pH of the activated sludge is adjusted to slightly alkaline and a source of multivalent metal ions is added to precipitate out the phosphorus from solution. Any multivalent metal ion that forms an insoluble phosphate can be used. Examples of multivalent metal cations include calcium, magnesium and iron. Additionally, other reagents, such as ammonia, may be added as needed to form the desired solid phosphate. In some embodiments, such as the illustrated embodiment of FIG. 17, reagents are fed into the phosphorus precipitation tank 70 by one or more lines represented by conduit 76. For example, one line may supply a base to adjust the pH of the activated sludge stream. Another line may supply a multivalent metal ion used to precipitate the phosphate. Yet another may supply a source of ammonia or raw wastewater. A mechanical mixer (not shown) can be used to insure adequate mixing of all materials. The phosphorus precipitation tank 70 may operate as a continuous, semi-continuous or batch process, and may be employed continuously or periodically. In the case of periodic use, the level of soluble phosphates in the activated sludge stream is allowed to build up over a period of time before the sludge stream is diverted to the phosphorus precipitation tank 70 for treatment.

In one embodiment, soluble phosphates are precipitated in the phosphorus removal tank 70 as struvite, $MgNH_4PO_4 \cdot 6H_2O$. Favorable reaction conditions require a slightly alkaline sludge stream and an adequate source of magnesium ions and ammonium ions. Since the pH of the activated sludge stream is usually neutral when it leaves the sidestream bioreactor 12, a standard base such as, but not limited to, NaOH, KOH, $NH_4OH$ and $Mg(OH)_2$ may be added. Typically, the pH of the activated sludge stream is adjusted to about 8 to about 10. More particularly, the pH is adjusted to about 8.5 to about 9.5. In addition to adjusting the pH, a source of magnesium ion must be present in the activated sludge stream. The amount of magnesium ion required is about 100% to about 120% the stoichiometric amount. More particularly, the amount of magnesium ion is about 110% the stoichiometric amount. If a sufficient source of magnesium ion exists in solution, no further source need be added. Otherwise, a source of magnesium ion such as, but not limited to, $MgCl_2$, $MgHCO_3$, MgO, $MgSO_4$, and $Mg(OH)_2$ may be added. Finally, a source of ammonium ion is required. Many sludge streams by nature have a high ammonia content that can provided an adequate source of ammonium ions. However, if necessary, raw wastewater or other sources of ammonia such as, but not limited to, $NH_4OH$ and $NH_4Cl$ may be added to the phosphorus precipitation tank 70 to provide a sufficient concentration of ammonium ions. The amount of ammonium in the activated sludge stream is preferably about 100% to about 120% the stoichiometric amount. The contents of the phosphorus precipitation tank 70 are mechanically mixed for about 20 minutes to about 2 hours. Soluble phosphates precipitate out of the sludge stream as struvite, $MgNH_4PO_4 \cdot 6H_2O$.

In a second embodiment, soluble phosphates are precipitated in the phosphorus precipitation tank 70 as calcium phosphate, $Ca_3(PO_4)_2$. Favorable reaction conditions require a slightly alkaline sludge stream and an adequate source of calcium ions. Since the pH of the sludge stream is usually neutral when it leaves the sidestream bioreactor 12, a standard base such as, but not limited to, NaOH, KOH, $NH_4OH$ and $Mg(OH)_2$ may be added. Typically, the pH of the sludge stream in the phosphorus precipitation tank 70 is adjusted to about 8 to about 10. More particularly, the pH is adjusted to about 8.5 to about 9.5. In addition to adjusting the pH, a source of calcium ions must be present in the sludge stream. The amount of calcium ions required is about 100% to about 120% the stoichiometric amount. More particularly, the amount of calcium ions is about 110% the stoichiometric amount. If a sufficient source of calcium ions exists in solution, no further source need be added. Otherwise, a source of calcium ions including, but not limited to, $CaCl_2$ and $Ca(OH)_2$ may be added. The contents of the phosphorus precipitation tank 70 are mechanically mixed for about 20 minutes to about 2 hours. Soluble phosphates precipitate out of the sludge stream as calcium phosphate, $Ca_3(PO_4)_2$.

The contents of the phosphorus precipitation tank 70 are then pumped by conduit 71 to one or more solid separators 73 to remove the solid phosphates without significant removal of biomass. The solid phosphates can be separated from the sludge stream based upon differential settling velocity using any number of mechanical means, including but not limited to, a gravity separator, a hydrocyclone and a centrifuge. The solid phosphates can then be discharged along path 78 as a concentrated sludge stream relatively low in biomass. The remainder of the sludge stream can be recycled back to the sidestream bioreactor 12 by conduit 77 for further treatment. In addition to, or alternatively, a portion of the sludge stream can be returned to the phosphorus removal tank 70 by conduit 75 to facilitate the formation of larger crystals by having the crystals formed earlier acting as seeds for the formation of larger crystals.

Figure 18:
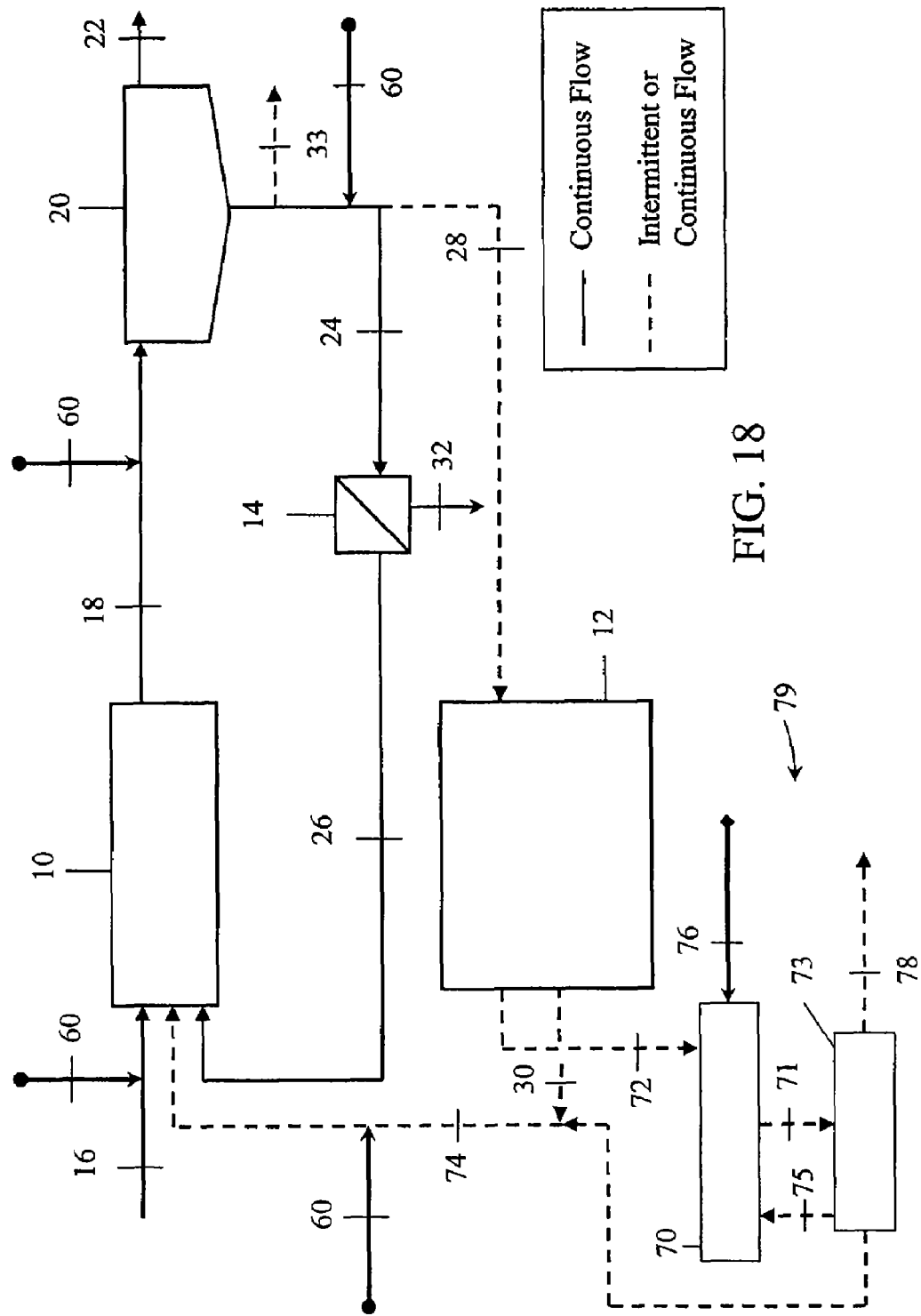
FIG. 18 is a schematic view of a fifth embodiment of an improved wastewater treatment system.

FIG. 18 represents a variation on the embodiment illustrated in FIG. 17. Accordingly, with the exception of mutually inconsistent features and elements between the embodiment of FIG. 18 and the embodiment of FIG. 17, reference is hereby made to the description above accompanying the embodiment of FIG. 17 for a more complete description of the features and elements (and the alternatives to the features and elements) of the embodiment of FIG. 18.

In the embodiment illustrated in FIG. 18, the activated sludge is allowed to settle in the sidestream bioreactor 12 creating a dense bottom layer and a relatively less dense top layer ("supernatant"). At least a portion of the dense bottom layer is returned by conduits 30 and 74 to the mainstream reactor 10. At least a portion of the supernatant is removed from the wastewater treatment system by conduit 72 and fed to a phosphorus removal system 79 to remove or reduce the amount of phosphorus in the activated sludge stream. The activated sludge from which a least a portion of the phosphorus has been removed is returned to the mainstream reactor 10 by conduit 74.

Figure 19:
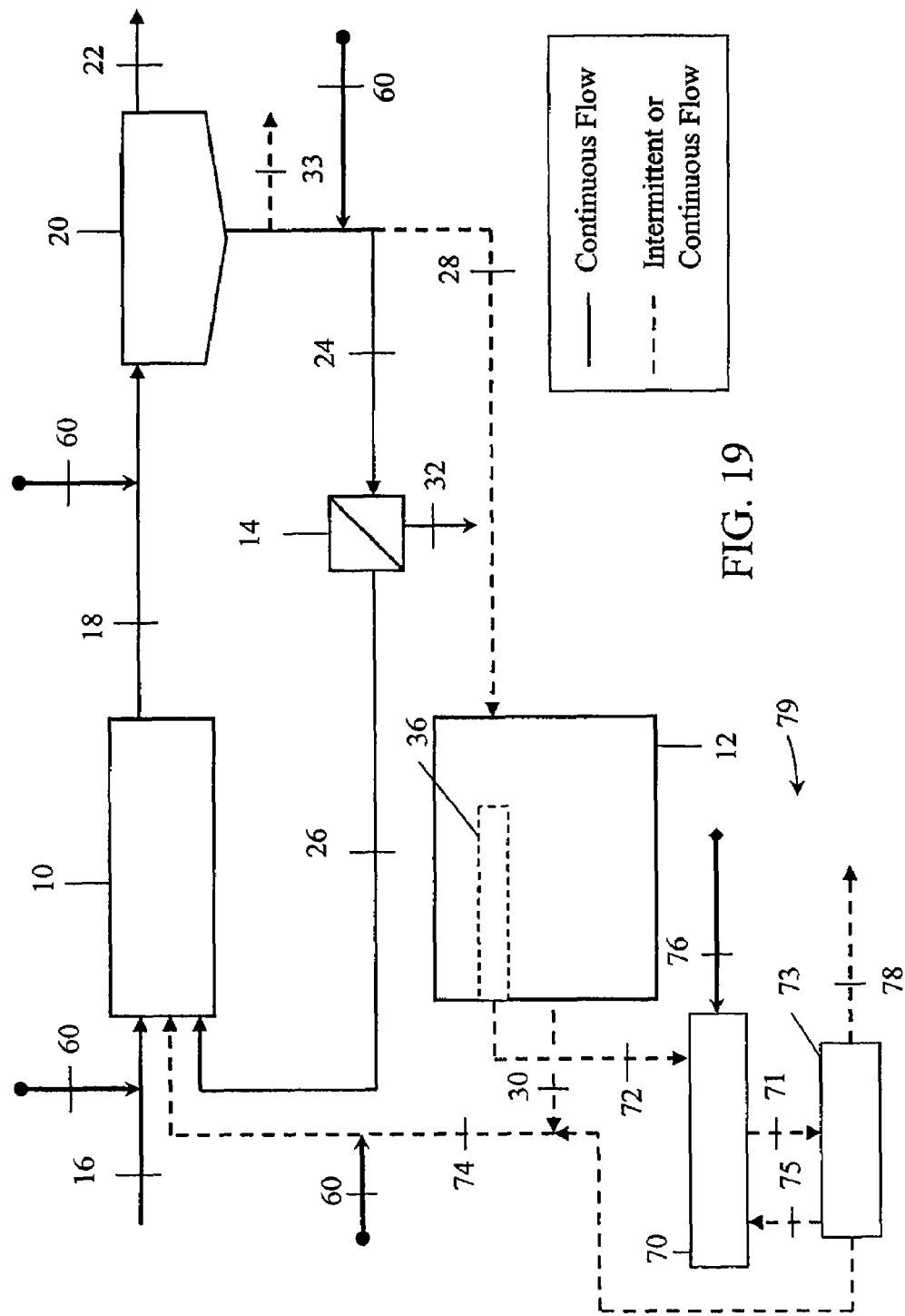
FIG. 19 is a schematic view of a sixth embodiment of an improved wastewater treatment system.

FIG. 19 represents a variation on the embodiment illustrated in FIG. 18. Accordingly, with the exception of mutually inconsistent features and elements between the embodiment of FIG. 19 and the embodiment of FIG. 18, reference is hereby made to the description above accompanying the embodiment of FIG. 18 for a more complete description of the features and elements (and the alternatives to the features and elements) of the embodiment of FIG. 19.

In the embodiment illustrated in FIG. 19, a membrane unit 36 is submerged in the activated sludge within the sidestream bioreactor 12 creating a membrane bioreactor. Reference can be made to FIG. 16 for a description of the membrane unit 36. Permeate from the sidestream bioreactor 12 is transferred to a phosphorus removal system 79 to remove or reduce the amount of phosphorus in the activated sludge stream. The activated sludge from which a least a portion of the soluble phosphorus has been removed is returned to the mainstream reactor 10 by conduit 74.

At least a portion of the activated sludge remaining in the sidestream bioreactor 12 is returned by conduit 30 to the mainstream reactor 10 as interchange activated sludge (IAS).

Figure 20:
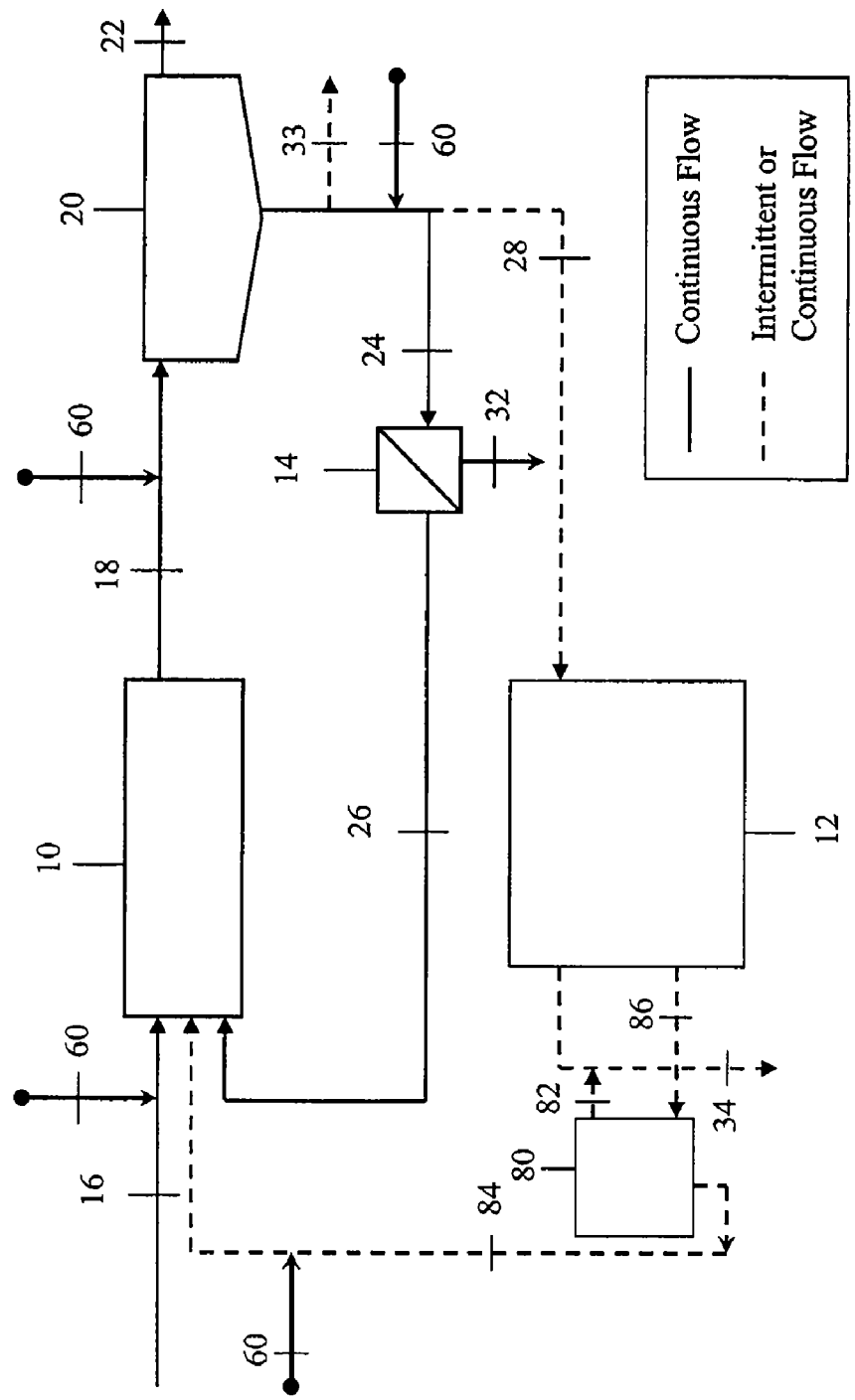
FIG. 20 is a schematic view of a seventh embodiment of an improved wastewater treatment system.

FIG. 20 represents a variation on the embodiment illustrated in FIG. 14. Accordingly, with the exception of mutually inconsistent features and elements between the embodiment of FIG. 20 and the embodiment of FIG. 14, reference is hereby made to the description above accompanying the embodiment of FIG. 14 for a more complete description of the features and elements (and the alternatives to the features and elements) of the embodiment of FIG. 20.

In the embodiment illustrated in FIG. 20, a thickening device 80 is employed to concentrate solids in the activated sludge stream. Activated sludge is allowed to settle in the sidestream bioreactor 12 creating a dense bottom layer and a relatively less dense top layer ("supernatant"). The supernatant is removed from the wastewater treatment system by conduit 34 and put to beneficial use in other applications. Alternatively, the supernatant may be disposed of in a sewer or an offsite disposal area. At least a portion of the dense bottom layer is fed by conduit 86 to a thickening device 80. The thickening device 80 can be any mechanical device that concentrates the solids in the activated sludge stream. Suitable thickening devices may include dissolved air flotation thickener (DAFT), gravity belt thickeners, belt presses, frame presses, and gravity settling thickeners. Within the thickening device 80 a stratification of the activated sludge occurs with a dense bottom layer and a less dense top layer. At least a portion of the dense bottom layer is returned to the mainstream reactor 10. Additionally, the less dense top layer may be removed from the system by conduits 82 and 34.

Figure 21:
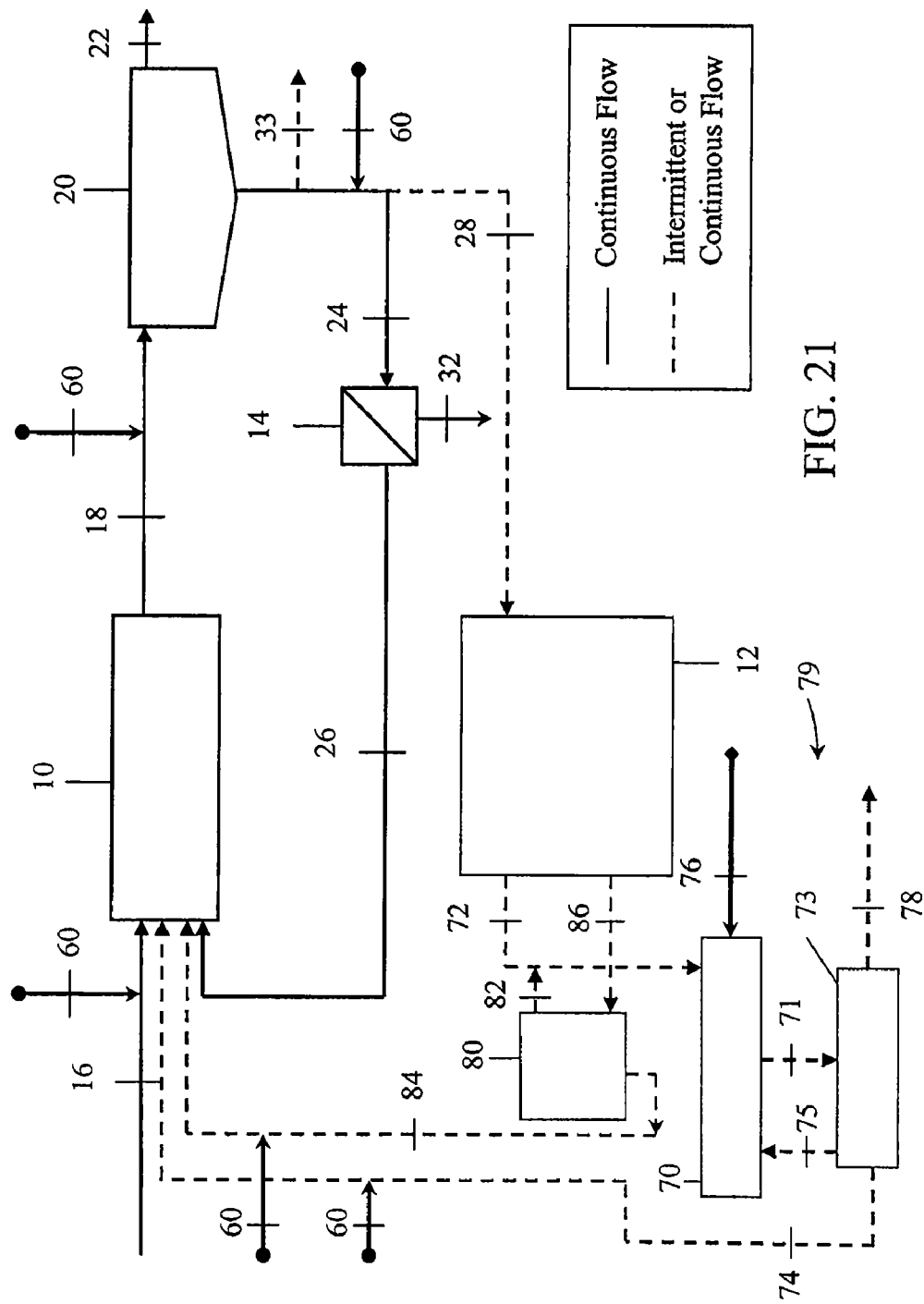
FIG. 21 is a schematic view of an eighth embodiment of an improved wastewater treatment system.

FIG. 21 represents a variation on the embodiment illustrated in FIG. 20. Accordingly, with the exception of mutually inconsistent features and elements between the embodiment of FIG. 21 and the embodiment of FIG. 20, reference is hereby made to the description above accompanying the embodiment of FIG. 20 for a more complete description of the features and elements (and the alternatives to the features and elements) of the embodiment of FIG. 21.

In the embodiment illustrated in FIG. 21, supernatant is removed from the sidestream bioreactor 12 and fed to a phosphorus removal system 79 to remove or reduce the amount of phosphorus in the activated sludge stream. Reference can be made to FIG. 17 for a description of the phosphorus removal system 79. The activated sludge from which a least a portion of the soluble phosphorus has been removed is returned to the mainstream reactor 10 by conduit 74.

Figure 22:
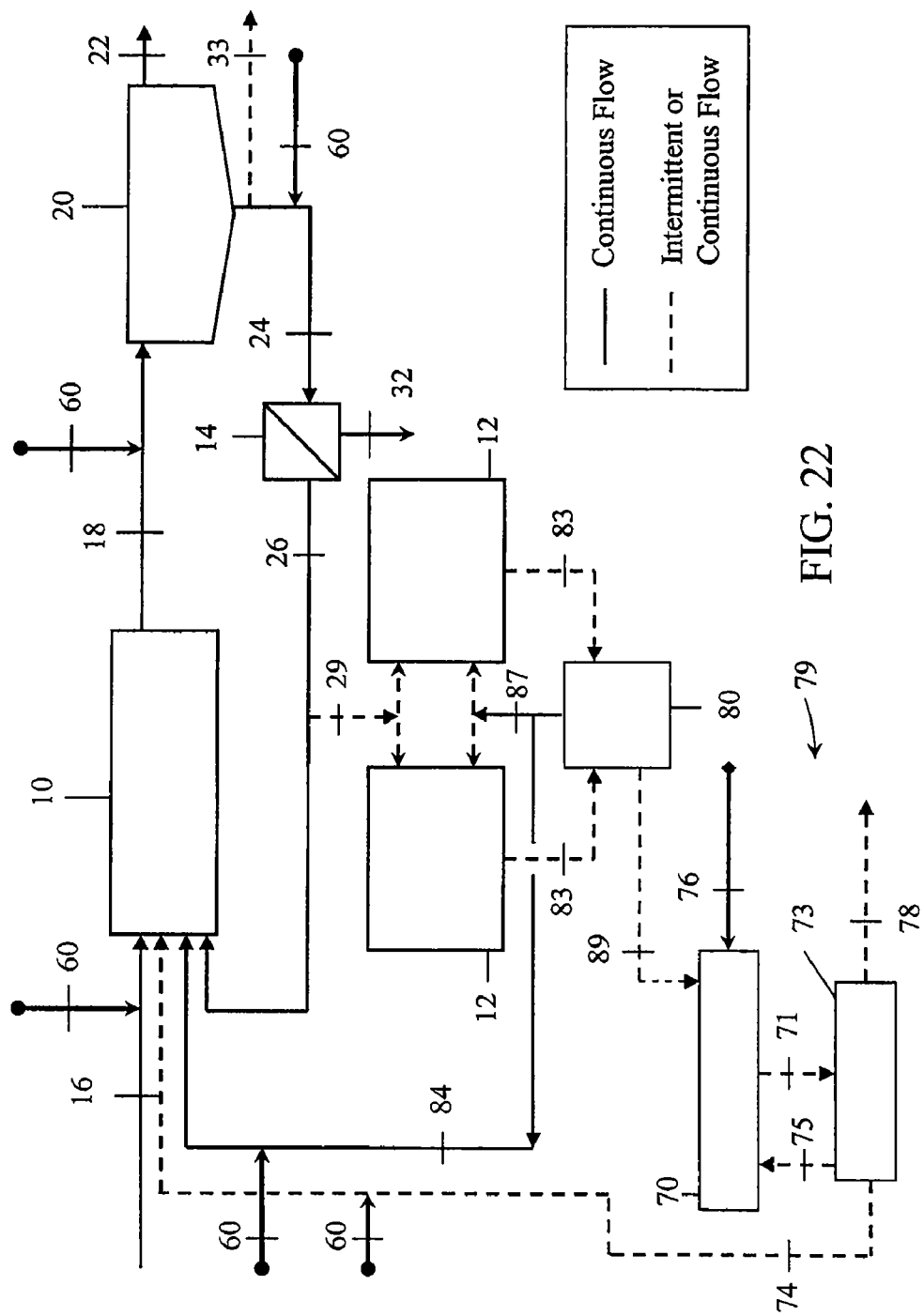
FIG. 22 is a schematic view of a ninth embodiment of an improved wastewater treatment system.

FIG. 22 represents a variation on the embodiment illustrated in FIG. 14. Accordingly, with the exception of mutually inconsistent features and elements between the embodiment of FIG. 22 and the embodiment of FIG. 14, reference is hereby made to the description above accompanying the embodiment of FIG. 14 for a more complete description of the features and elements (and the alternatives to the features and elements) of the embodiment of FIG. 22.

In the embodiment illustrated in FIG. 22, at least a potion of the RAS from line 26 is fed by conduit 29 to two sidestream bioreactors 12 for processing. From the sidestream bioreactors 12, activated sludge is transferred by conduits 83 to a thickening device 80 to concentrate the solids within the activated sludge stream. The thickening device 80 can be any mechanical device that concentrates the solids in the activated sludge stream. Suitable thickening devices may include DAFT, gravity belt thickeners, belt presses, frame presses, and gravity settling thickeners. Within the thickening device 80 a stratification of the activated sludge occurs with a dense bottom layer and a less dense top layer. The activated sludge within the thickening device 80 may be recycled to the sidestream bioreactors 12 by conduit 87, returned to the mainstream reactor 10 by conduit 84, and/or fed to a phosphorus removal system 79 by conduit 89 to remove at least a portion of the phosphorus from the activated sludge stream. Reference can be made to FIG. 17 for a description of the phosphorus removal system 79. Activated sludge from which phosphorus has been removed is returned to the mainstream reactor 10 by conduit 74.

Thus, the invention provides, among other things, multivalent metal ion management for low sludge processes. Various features and advantages of the invention are set forth in the following claims.

What is claimed is:

1. A method for reducing waste activated sludge in a wastewater treatment system, the method comprising:
   combining wastewater comprising BOD with bacteria-laden sludge in a mainstream reactor to form a mixed liquor;
   separating the mixed liquor into a clear effluent and an activated sludge stream;
   returning a first portion of the activated sludge stream to the mainstream reactor;
   processing a second portion of the activated sludge stream in a sidestream bioreactor;
   returning at least a portion of the processed activated sludge stream in the sidestream bioreactor to the mainstream reactor; and
   managing multivalent cation content of at least one of the wastewater, the mixed liquor, the activated sludge stream and combinations thereof to reduce the generation of waste activated sludge.

2. The method of claim 1, wherein managing multivalent cation content of at least one of the wastewater, the mixed liquor, the activated sludge stream and combinations thereof produces a ratio of multivalent metal ions to BOD of about 1:400 (wt/wt) to about 1:25 (wt/wt).

3. The method of claim 1, wherein managing multivalent cation content of at least one of the wastewater, the mixed liquor, the activated sludge stream and combinations thereof produces a ratio of multivalent metal ions to BOD of about 1:300 (wt/wt) to about 1:50 (wt/wt).

4. The method of claim 1, wherein managing multivalent cation content of at least one of the wastewater, the mixed liquor, the activated sludge stream and combinations thereof produces a ratio of multivalent metal ions to BOD of about 1:100 (wt/wt) to about 1:50 (wt/wt).

5. The method of claim 1, wherein multivalent metal ions comprising $Fe^{3+}$ are added to at least one of the wastewater, the mixed liquor, the activated sludge stream and combinations thereof.

6. The method of claim 5, wherein at least one of the mainstream reactor, the sidestream bioreactor and a combination thereof comprises an anaerobic environment.

7. The method of claim 1, wherein multivalent metal ions comprising at least one of $Ca^{2+}$ and $Mg^{2+}$ are added to at least one of the wastewater, the mixed liquor, the activated sludge stream and combinations thereof.

8. The method of claim 7, wherein at least one of the mainstream reactor, the sidestream bioreactor and a combination thereof comprises an aerobic environment.

9. The method of claim 1, wherein multivalent metal ions are added to the wastewater upstream of the mainstream reactor.

10. The method of claim 1, wherein multivalent metal ions are added to the mixed liquor prior to separation into a clear effluent and activated sludge stream.

11. The method of claim 1, wherein multivalent metal ions are added to the activated sludge stream upstream of the sidestream bioreactor.

12. The method of claim 1, wherein multivalent metal ions are added to the activated sludge stream downstream of the sidestream bioreactor.

13. The method of claim 1, wherein the sidestream bioreactor is a membrane bioreactor.

14. The method of claim 1, further comprising passing at least a portion of the activated sludge stream in the sidestream bioreactor through a thickening device before returning the activated sludge stream to the mainstream reactor.

15. The method of claim 1, further comprising passing the first portion of the activated sludge stream through a screening device before returning the first portion of the activated sludge stream to the mainstream reactor.

16. The method of claim 1, wherein the method is at least one of a batch process, a continuous process and a combination thereof.

17. A method for reducing waste activated sludge in a wastewater treatment system, the method comprising:
   combining wastewater comprising BOD and phosphorus with bacteria-laden sludge in a mainstream reactor to form a mixed liquor;
   separating the mixed liquor into a clear effluent and an activated sludge stream;
   returning a first portion of the activated sludge stream to the mainstream reactor;
   processing a second portion of the activated sludge stream in a sidestream bioreactor;
   removing phosphorus from at least a portion of the activated sludge stream processed in the sidestream bioreactor;
   transferring at least a portion of the activated sludge stream from which phosphorus has been removed to the mainstream reactor; and
   adding multivalent metal ions to at least one of the wastewater, the mixed liquor, the activated sludge stream and combinations thereof to reduce the generation of waste activated sludge.

18. The method of claim 17, wherein adding multivalent metal ions to at least one of the wastewater, the mixed liquor, the activated sludge stream and combinations thereof produces a ratio of multivalent metal ions to BOD of about 1:400 (wt/wt) to about 1:25 (wt/wt).

19. The method of claim 17, wherein adding multivalent metal ions to at least one of the wastewater, the mixed liquor, the activated sludge stream and combinations thereof produces a ratio of multivalent metal ions to BOD of about 1:300 (wt/wt) to about 1:50 (wt/wt).

20. The method of claim 17, wherein adding multivalent metal ions to at least one of the wastewater, the mixed liquor, the activated sludge stream and combinations thereof produces a ratio of multivalent metal ions to BOD of about 1:100 (wt/wt) to about 1:50 (wt/wt).

21. The method of claim 17, wherein the multivalent metal ions comprise $Fe^{3+}$.

22. The method of claim 21, wherein at least one of the mainstream reactor, the sidestream bioreactor and a combination thereof comprises an anaerobic environment.

23. The method of claim 22, wherein the multivalent metal ions comprise at least one of $Ca^{2+}$, $Mg^{2+}$ and a combination thereof.

24. The method of claim 17, wherein at least one of the mainstream reactor, the sidestream bioreactor and a combination thereof comprises an aerobic environment.

25. The method of claim 17, wherein the multivalent metal ions are added to the wastewater upstream of the mainstream reactor.

26. The method of claim 17, wherein the multivalent metal ions are added to the mixed liquor prior to separation into a clear effluent and activated sludge stream.

27. The method of claim 17, wherein the multivalent metal ions are added to the activated sludge stream upstream of the sidestream bioreactor.

28. The method of claim 17, wherein the multivalent metal ions are added to the activated sludge stream downstream of the sidestream bioreactor.

29. The method of claim 17, wherein the sidestream bioreactor is a membrane bioreactor.

30. The method of claim 17, further comprising passing at least a portion of the activated sludge in the sidestream bioreactor through a thickening device before returning the activated sludge to the mainstream reactor.

31. The method of claim 17, further comprising passing the first portion of activated sludge through a screening device before returning the first portion of the activated sludge to the mainstream reactor.

32. The method of claim 17, wherein the method is at least one of a batch process, a continuous process and a combination thereof.

33. The method of claim 17, wherein removing phosphorus from the second portion of the activated sludge comprises adding a source of multivalent metal ions to the activated sludge to precipitate phosphate solids and separating and removing the phosphate solids from the activated sludge.

34. A method for reducing waste activated sludge in a wastewater treatment system, the method comprising:
combining wastewater comprising BOD and phosphorus with bacteria-laden sludge in a mainstream reactor to form a mixed liquor;
separating the mixed liquor into a clear effluent and activated sludge stream;
returning a first portion of the activated sludge stream to the mainstream reactor;
processing a second portion of the activated sludge stream in a sidestream bioreactor;
returning at least a portion of the processed activated sludge stream to the mainstream reactor; and
adding $Fe^{3+}$ ions to at least one of the wastewater, the mixed liquor, the activated sludge stream and combinations thereof to reduce the generation of waste activated sludge,
wherein at least one of the mainstream reactor, the sidestream bioreactor and a combination thereof comprises an anaerobic environment.

35. The method of claim 34, wherein adding $Fe^{3+}$ ions to at least one of the wastewater, the mixed liquor, the activated sludge stream and combinations thereof produces a ratio of multivalent metal ions to BOD of about 1:400 (wt/wt) to about 1:25 (wt/wt).

36. The method of claim 34, wherein adding $Fe^{3+}$ ions to at least one of the wastewater, the mixed liquor, the activated sludge stream and combinations thereof produces a ratio of multivalent metal ions to BOD of about 1:300 (wt/wt) to about 1:50 (wt/wt).

37. The method of claim 34, wherein adding $Fe^{3+}$ ions to at least one of the wastewater, the mixed liquor, the activated sludge stream and combinations thereof produces a ratio of multivalent metal ions to BOD of about 1:100 (wt/wt) to about 1:50 (wt/wt).

38. The method of claim 34, wherein the $Fe^{3+}$ ions are added to the influent upstream of the mainstream reactor.

39. The method of claim 34, wherein the $Fe^{3+}$ ions are added to the activated sludge stream upstream of the sidestream bioreactor.

40. The method of claim 34, wherein the sidestream bioreactor is a membrane bioreactor.

41. The method of claim 34, further comprising passing at least a portion of the activated sludge stream in the sidestream bioreactor through a thickening device before returning the activated sludge stream to the mainstream bioreactor.

42. The method of claim 34, wherein the method is at least one of a batch process, a continuous process and a combination thereof.

43. The method of claim 34, further comprising removing phosphorus from at least a portion of the activated sludge stream processed in the sidestream bioreactor before returning the activated sludge stream to the mainstream reactor.

44. The method of claim 34, further comprising adding at least one of $Ca^{2+}$, $Mg^{2+}$ and a combination thereof, wherein at least one of the mainstream reactor, the sidestream bioreactor and combination thereof comprises an aerobic environment.

45. The method of claim 1, wherein managing multivalent cation content comprises promoting formation of a biopolymer fraction in at least one of the wastewater, the mixed liquor, the activated sludge stream and combinations thereof.

46. The method of claim 45, wherein the biopolymer fraction comprises a divalent cation-bound biopolymer.

47. The method of claim 46, wherein promoting formation of the divalent cation-bound biopolymer comprises supplying at least one of $Ca^{2+}$ and $Mg^{2+}$.

48. The method of claim 45, wherein the biopolymer fraction comprises an Fe-associated biopolymer.

49. The method of claim 48, wherein promoting formation of the Fe-associated biopolymer comprises increasing floc Fe content.

50. The method of claim 1, wherein managing multivalent cation content comprises associating organic matter in at least one of the wastewater, the mixed liquor, the activated sludge stream and combinations thereof with multivalent cations.

51. The method of claim 50, wherein the multivalent cations comprise divalent cations.

52. The method of claim 51, wherein the divalent cations comprise at least one of $Ca^{2+}$ and $Mg^{2+}$.

53. The method of claim 50, wherein the multivalent cations comprise $Fe^{3+}$ ions.

54. The method of claim 1, further comprising removing phosphorus from at least a portion of the processed activated sludge stream.

55. The method of claim 44, wherein adding $Fe^{3+}$ ions comprises promoting formation of an Fe-associated biopolymer in at least one of the wastewater, the mixed liquor, the activated sludge stream and combinations thereof.

* * * * *